United States Patent
Gundavelli et al.

(10) Patent No.: US 11,234,182 B1
(45) Date of Patent: Jan. 25, 2022

(54) DOWNLINK PACKET REPLICATION TO SUPPORT HANDOVER

(71) Applicant: Cisco Technology, Inc., San Jose, CA (US)

(72) Inventors: Srinath Gundavelli, San Jose, CA (US); Sangram Kishore Lakkaraju, Bangalore (IN); Mark Grayson, Berkshire (GB); Oliver James Bull, Bristol (GB); Louis Gwyn Samuel, Wiltshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/928,471

(22) Filed: Jul. 14, 2020

(51) Int. Cl.
*H04W 4/00* (2018.01)
*H04W 40/36* (2009.01)
*H04W 36/08* (2009.01)
*H04W 68/00* (2009.01)
*H04W 72/12* (2009.01)
*H04W 76/12* (2018.01)
*H04W 76/11* (2018.01)
*H04W 60/00* (2009.01)

(52) U.S. Cl.
CPC .......... *H04W 40/36* (2013.01); *H04W 36/08* (2013.01); *H04W 60/00* (2013.01); *H04W 68/005* (2013.01); *H04W 72/1263* (2013.01); *H04W 76/11* (2018.02); *H04W 76/12* (2018.02)

(58) Field of Classification Search
USPC .......................... 455/436–445; 370/329–331
See application file for complete search history.

(56) References Cited

U.S. PATENT DOCUMENTS

| | | | |
|---|---|---|---|
| 10,349,333 | B2 | 7/2019 | Pillay-Esnault |
| 10,362,522 | B2 | 7/2019 | Pillay-Esnault |
| 10,516,544 | B2 | 12/2019 | Moreno et al. |
| 10,555,167 | B2 | 2/2020 | Hooda et al. |
| 2002/0133534 | A1* | 9/2002 | Forslow .............. H04L 63/0272 709/200 |

OTHER PUBLICATIONS

Javalkar, Chandrakumar, "S1 handover vs X2 handover", http://alltechstuffinoneplace.blogspot.com/2013/08/s1-handover-vs-x2-handover.html, Aug. 4, 2013, 5 pages.
(Continued)

*Primary Examiner* — Suhail Khan
(74) *Attorney, Agent, or Firm* — Edell, Shapiro & Finnan, LLC

(57) ABSTRACT

Techniques are provided for downlink packet replication to support handovers. In one example, downlink packet replication occurs on a fabric node in an S1AP handover scenario. In another example, downlink packet replication occurs on a source Access Point (AP) using a target AP as a secondary AP in an S1AP handover scenario. In yet another example, downlink packet replication occurs on a source AP using packet encapsulation in an S1AP handover scenario. In still another example, downlink packet replication occurs on a source AP in an X2 handover scenario. Similar techniques are provided for any suitable telecommunications/cellular technology.

22 Claims, 21 Drawing Sheets

(56) References Cited

OTHER PUBLICATIONS

Netmanias, "LTE Security II: NAS and AS Security", https://www.netmanias.com/en/post/techdocs/5903/lte-security/lte-security-ii-nas-and-as-security, Aug. 5, 2013, 6 pages.

Aghdai, Ashkan et al., "Enabling Mobility in LTE-Compatible Mobile-edge Computing with Programmable Switches", arXiv:1905.05258v1 [cs.NI], May 13, 2019, 25 pages.

CableLabs, "A Comparative Introduction to 4G and 5G Authentication", https://www.cablelabs.com/insights/a-comparative-introduction-to-4g-and-5g-authentication, Winter 2019, 19 pages.

D. Farinacci, et al., "LISP for the Mobile Network," draft-farinacci-lisp-mobile-network-08, Network Working Group, Internet-Draft, Intended status: Experimental, Mar. 12, 2020, 25 pages.

\* cited by examiner

DOWNLINK PACKET REPLICATION TO SUPPORT HANDOVER

TECHNICAL FIELD

The present disclosure relates to telecommunications technology.

BACKGROUND

Handover support for a User Equipment (UE) in a 3rd Generation Partnership Project (3GPP) network can be based on S1AP or X2 handover procedures in the fourth generation (4G) case. X2 handover procedures may be utilized when an X2 interface is available between the Access Points (APs) involved in the handover. S1AP handover procedures may be utilized when no such X2 interface is available. These handover procedures may ensure that the connection to the UE is maintained as the UE moves between two APs.

DESCRIPTION OF EXAMPLE EMBODIMENTS

Overview

In one example embodiment, techniques are provided for downlink packet replication on a fabric node or on a source Access Point (AP) using a target AP as a secondary AP in an S1AP handover scenario. A notification that a handover is to occur for a User Equipment (UE) from a source AP to a target AP is obtained. A Routing Locator (RLOC) for a tunnel router associated with the source AP and a RLOC for a tunnel router associated with the target AP are obtained. A registration message including a mapping of an endpoint identifier of the UE to the RLOC for the tunnel router associated with the source AP and the RLOC for the tunnel router associated with the target AP is provided to a Map Server (MS). Based on the registration message, the MS causes downlink packets destined for the UE to be replicated and provided to the source AP and to the target AP.

In another example embodiment, techniques are provided for downlink packet replication on a source AP using packet encapsulation in an S1AP handover scenario. a notification that a handover is to occur for a UE from a source AP to a target AP is obtained. An indication to decapsulate encapsulated downlink packets destined for the UE is provided to the target AP. The encapsulated downlink packets destined for the UE are encapsulated with an outer header identifying the source AP as a source of the encapsulated downlink packets destined for the UE and further identifying the target AP as a destination of the encapsulated downlink packets destined for the UE. An indication to replicate downlink packets destined for the UE to generate a first copy of the downlink packets destined for the UE and a second copy of the downlink packets destined for the UE, and encapsulate the first copy of the downlink packets destined for the UE with the outer header to generate the encapsulated downlink packets destined for the UE, is provided to the source AP.

Example Embodiments

Figure 1:
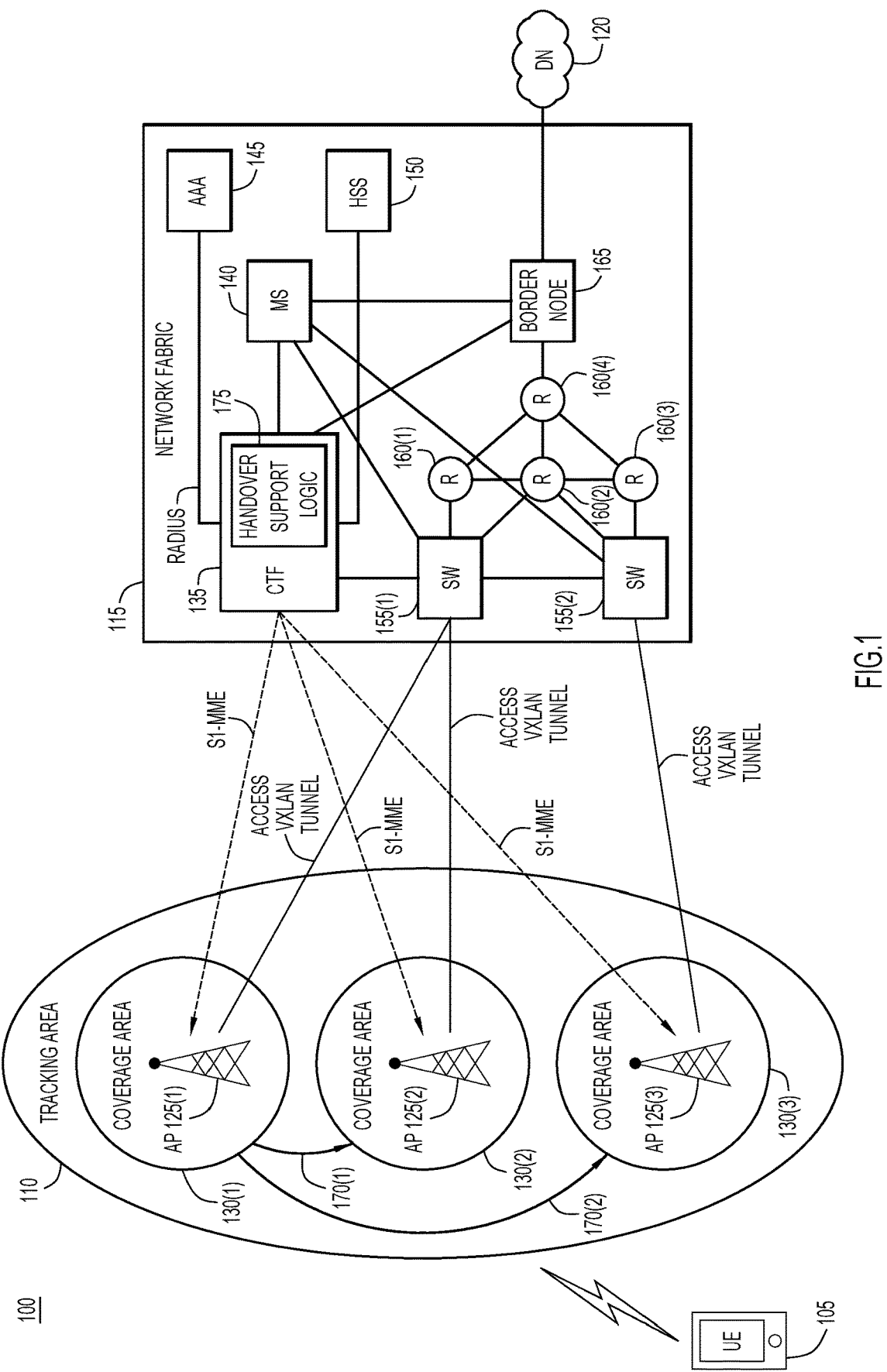
FIG. 1 illustrates a system configured for downlink packet replication to support a handover, according to an example embodiment.

FIG. 1 illustrates an example system 100 configured for downlink packet replication to support a handover (e.g., an S1AP or X2 handover). System 100 includes User Interface (UE) 105, tracking area 110, network fabric 115, and Data Network (DN) 120. Tracking area 110 includes Access Points (APs) 125(1)-125(3), which provide network access coverage to respective coverage areas 130(1)-130(3). Network fabric 115 includes control plane entities such as Cellular Termination Function (CTF) 135, Map Server (MS) 140, Authentication, Authorization, and Accounting (AAA) server 145, and Home Subscriber Server (HSS) 150, and user/data plane entities such as switches 155(1) and 155(2), network nodes (e.g., routers) 160(1)-160(4), and border node 165.

UE 105 may be associated with any suitable device configured to initiate a flow in system 100. For example, UE 105 may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, and/or any other device and/or combination of devices, components, elements, and/or objects capable of initiating voice, audio, video, media, or data exchanges within system 100. UE 105 may also include any suitable interface to a human user such as a microphone, a display, a keyboard, or other terminal equipment. UE 105 may also be any device that seeks to initiate a communication on behalf of another entity or element such as a program, a database, or any other component, device, element, or object capable of initiating an exchange within system 100. UE 105 may be configured with appropriate hardware (e.g., processor(s), memory element(s), antennas and/or antenna arrays, baseband processors (modems), and/or the like), software, logic, and/or the like to facilitate respective over-the-air (air) interfaces for accessing/connecting to APs 125(1)-125(3). It will be appreciated that any number of UEs may be present in system 100.

Network fabric 115 may be associated with a private network, such as a software-defined access fabric configured specifically for use by users associated with an enterprise. By 'private' it is meant that a private cellular access network provides network connectivity/services to clients (e.g., UE 105) served by a network operator and/or service provider of the private cellular access network, such as an enterprise. In some instances, a private network may also be referred to as a non-public network (NPN). In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/service providers, enterprise network operators/service providers, and/or third party network operators/service providers (e.g., neutral host network operators/service providers, cloud service providers, etc.). In one example, the user of UE 105 is an employee of the enterprise associated with network fabric 115.

In various embodiments, DN 120 may be any combination of the Internet, an Internet Protocol (IP) Multimedia Subsystem (IMS), Ethernet network, Ethernet switching system(s), and/or the like. DN 120 may facilitate user plane (e.g., user data/data transfer) connectivity for per-access UE 105 sessions. For example, UE 105 may access various services, applications, etc. from DN 120.

One or more of APs 125(1)-125(3) may be cellular APs that terminate a cellular (e.g., fourth generation (4G) Long-Term Evolution (LTE) or fifth generation (5G) New Radio (NR)) air interface and may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G LTE, private 5G NR, private Citizens Broadband Radio Service (CBRS), etc.). In various embodiments, APs 125(1)-125(3) may be implemented as any combination of an evolved Node B (eNB) to facilitate 4G LTE air accesses, a next generation Node B (gNB) to facilitate 5G NR air accesses, a next generation (NG) radio to facilitate any next generation air accesses, a CBRS Device (CBSD) to facilitate CBRS accesses, and/or the like now known or hereafter developed.

CTF 135 may be a control plane entity that provides or is responsible for any combination of cellular-based access authentication services, authorization services, mobility management control, session management services with various functions being supported on a per-session basis, selection and control of user plane entities (e.g., per-session), if applicable, and/or the like. In various embodiments, CTF 135 may be implemented with functionality as may be inherited from any combination of a 4G LTE Mobility Management Entity (MME); a Serving Gateway (SGW), and/or a Packet Data Network (PDN) Gateway (PGW); a 5G Access and Mobility Management Function (AMF) and/or Session Management Function (SMF); and/or the like now known or hereafter developed. In one example, CTF 135 may terminate the S1-MME interface (in the 4G case) or the N1 interface (in the 5G case) from one or more of APs 125(1)-125(3) (e.g., one or more eNBs/gNBs). The 4G case with the S1-MME interfaces is illustrated in FIG. 1.

MS 140 is a control plane entity (e.g., a Locator Identifier (ID) Separation Protocol (LISP) function) that represents a distributed mapping database and service that accepts registration information for clients and/or other endpoint users/devices, etc. (e.g., UE 105), and stores mappings between numbering or name space constructs. LISP is a control plane protocol that may facilitate IP mobility for system 100. Although embodiments herein provide example details associated with a LISP implementation, other control plane protocols may be implemented for system 100 including, but not limited to, Proxy Mobile IP version 6 (PMIPv6), Identifier Locator Addressing (ILA), etc.

A LISP implementation may utilize various constructs including Routing Locators (RLOCs) that may be associated with edge and border switches (e.g., switches 155(1) and 155(2) and border node 165)) and Endpoint IDs (EIDs) that may be associated with/identify clients or other endpoints (e.g., UE 105) in order to facilitate mobility for network fabric 115. An RLOC may be an IP address or other ID associated with an element in which the nomenclature 'RLOC=element' may generally represent an RLOC set to the ID of the element. IP addresses as discussed for embodiments described herein may be implemented as IP version 4 (IPv4) and/or IPv6 addresses. Other variations for setting an RLOC may be envisioned using, for example, Type-Length-Value (TLV) expressions, or the like.

For the LISP implementation of system 100, MS 140 may store mappings, generally known as EID-to-RLOC mappings, between RLOCs for fabric switches/functions/etc. (e.g., switches 155(1) and 155(2) and border node 165) and EIDs for clients (e.g., UE 105) for which traffic is handled or otherwise associated with the switches/functions/etc. MS 140 may associate EIDs with any combination of IP addresses, Media Access Control (MAC) addresses, or other identifiers for UEs for different EID-to-RLOC mappings that may be maintained/managed within network fabric 115. MS 140 may also communicate EID-to-RLOC mapping information to various elements of network fabric (e.g., switches 155(1) and 155(2), network nodes 160(1)-160(4), border node 165, etc.). MS 140 may include map resolver functionality such as obtaining map request messages and processing/forwarding those messages for MS 140. Such information may be stored in the map-cache of the elements to facilitate routing via network fabric 115.

AAA server 145 and HSS 150 may provide/be responsible for any combination of: providing authentication, authorization, and accounting functions for clients (e.g., UE 105) that may be present in system 100; managing subscription/policy information for one or more clients that may be present in system 100 (e.g., access profile information, among other subscription/policy information); maintaining per-client session information for various accesses to which each client is connected; combinations thereof; and/or the like. In various embodiments, AAA server 145 and HSS 150 may be implemented as any combination of standalone and/or combined elements (e.g., separate AAA and HSS elements or a combined AAA/HSS element) in order to facilitate AAA-based operations as well as policy-based operations for network fabric 115.

Generally, authentication refers to the process where an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc. It will be appreciated that AAA server 145 and/or HSS 150 may include cellular authentication functionality distributed across one or more servers.

In various embodiments, AAA server 145 and/or HSS 150 may be configured with or obtain (e.g., from an external database/service/etc.) per-client access profile information that may include, but not be limited to, client (e.g., user/device) identity information, authentication type attributes (e.g., authentication type, sub-type, etc.), authentication attributes (e.g., credentials, passwords, keys, etc.), combinations thereof, and/or the like. Additionally, AAA server 145 and/or HSS 150 may be configured with or obtain (e.g., from an external database/service/etc.) per-client subscription/policy information that may include, but not be limited to, service quality information such as Quality of Service (QoS) information, QoS Class Identifier (QCI), Guaranteed Bit Rate (GBR), Maximum Bit Rate (MBR), Aggregate Maximum Bit Rate (AMBR), Allocation and Retention Priority (ARP), packet delay information, packet loss information, combinations thereof, and/or the like for one or more client sessions. In various embodiments, subscription/policy information may also include a 3rd Generation Partnership Project (3GPP) service name such as AP Name (APN) information (for 4G networks), Data Network Name (DNN) information (for 5G networks), combinations thereof, and/or the like for one or more client sessions.

In various embodiments, AAA server 145 and/or HSS 150 may be configured with one or more databases/repositories/etc. and/or may interface with one or more external databases/repositories/etc. in order to obtain and/or be configured with access profile information, subscription/policy information, etc. for clients. Such internal/external databases/repositories/etc. may include any combination of enterprise databases, repositories, and/or the like for one or more clients that may be allowed to connect to accesses with which network fabric 115 may interface. In various embodiments, AAA server 145 and/or HSS 150 may be implemented as an AAA server, an enterprise policy server/manager, a 3GPP HSS, combinations thereof, and/or the like.

AAA server 145 may be capable of interfacing/communicating with other elements of system 100 (e.g., CTF 135) via Remote Authentication Dial-In User Service (RADIUS) protocol mechanisms (e.g., messaging, signaling, etc.) or Diameter protocol. FIG. 1 illustrates AAA server 145 communicating with CTF 135 via the RADIUS protocol. HSS 150 may be capable of interfacing/communicating with other elements of system 100 (e.g., CTF 135) via 3GPP S6a interface mechanisms, S6a-based interface mechanisms (e.g., for architectures that may involve interfaces based on, but not strictly adhering to, 3GPP defined S6a interface mechanisms), Application Programming Interface (API) mechanisms (e.g., for messaging, signaling, etc. that may be defined by an enterprise, 3rd-party, application, etc.), fabric-defined interfaces (e.g., as may be defined by an enterprise), combinations thereof, and/or the like. FIG. 1 illustrates HSS 150 communicating with CTF 135 via one or more 3GPP S6a interface mechanisms or S6a-based interface mechanisms.

Switches 155(1) and 155(2), network nodes 160(1)-160(4), and border node 165 may transmit user plane packets between APs 125(1)-125(3) and DN 120. Switch 155(1) may be any suitable network node configured to obtain/provide network communications (e.g., packets) from/to APs 125(1) and 125(2). Switch 155(2) may be any suitable network node configured to obtain/provide network communications (e.g., packets) from/to AP 125(3). Network nodes 160(1)-160(4) may be any suitable network node(s) configured to transmit network communications between switches 155(1) and 155(2) and border node 165. Border node 165 may be any suitable network node associated with DN 120 configured to obtain/provide network communications from/to DN 120. For instance, border node 165 may be an edge router for network fabric 115. In one example, switches 155(1) and 155(2) and/or border node 165 are IP forwarding elements that support the LISP ingress/egress Tunnel Router (xTR) functions. Switches 155(1) or 155(2) may also be referred to interchangeably as a "fabric edge node" and border node 165 may also be referred to interchangeably as a "fabric border node." In one example, network nodes 160(1)-160(4) may be underlay network elements unaware of LISP operations.

Although various interconnections/interfaces among various elements of network fabric 115 are illustrated in FIG. 1 (e.g., among control plane entities such as CTF 135, MS 140, AAA server 145, and HSS 150, and/or among user plane entities such as switches 155(1) and 155(2), network nodes 160(1)-160(4), and border node 165), it is to be understood that any elements of network fabric 115 may be interconnected and/or interface using any wired and/or wireless connections to facilitate communications, operations, etc. among the elements as discussed for techniques described herein.

FIG. 1 illustrates two handover scenarios, represented by arrows 170(1) and 170(2). In handover scenario 170(1), UE 105 transitions from AP 125(1) to AP 125(2) (e.g., via an S1AP based handover procedure or an X2 based handover procedure). As explained in greater detail below, because APs 125(1) and 125(2) are both attached to switch 155(1), an RLOC change may not be necessary (e.g., the RLOC of switch 155(1) may be utilized throughout the handover process). Accordingly, handover scenario 170(1) may be referred to as an "intra-AP handover scenario." In handover scenario 170(2), UE 105 transitions from AP 125(1) to AP 125(3) (e.g., via an S1AP based handover procedure or an X2 based handover procedures). As explained in greater detail below, because APs 125(1) and 125(3) are attached to different switches (switches 155(1) and 155(2), respectively), an RLOC change may be utilized (e.g., the RLOC of switch 155(1) may be replaced with the RLOC of switch 155(2) during the handover process). Accordingly, handover scenario 170(2) may be referred to as an "inter-AP handover scenario."

The AP from which UE 105 is transitioning may be referred to as a "source AP," and the AP to which UE 105 is transitioning may be referred to as a "target AP." Thus, in handover scenario 170(1), AP 125(1) is the source AP and AP 125(2) is the target AP. In handover scenario 170(2), AP 125(1) is the source AP and AP 125(3) is the target AP. In either handover scenario 170(1) or 170(2), traditionally there would be a risk of packet loss while UE 105 is transitioning from the source AP to the target AP. For example, downlink packets from DN 120 destined for UE 105 could be routed to AP 125(1) after AP 125(1) is no longer configured to provide downlink packets to UE 105, and those packets could be lost to UE 105. Such packet loss during handover can cause poor user experience.

Accordingly, CTF 135 includes handover support logic 175 to enable downlink packet replication to support handovers in system 100. Handover support logic 175 may cause CTF 135 to effectuate replication of downlink packets during a handover and forwarding of the downlink packets to both the source AP and the target AP. Thus, regardless of whether UE 105 can communicate with the source AP or target AP, at least one of the source or target APs may provide the downlink packets to UE 105, thereby minimizing packet loss. In order to achieve downlink packet replication in system 100, CTF 135 may effectively build and manage an interworking between 3GPP control plane elements and LISP forwarding elements to ensure the states in the forwarding plane of network fabric 115 remain accurate. Thus, system 100 may extend support of S1AP and X2 handover procedures to enterprise environments utilizing private cellular access in the LISP-based user plane.

Figure 2:
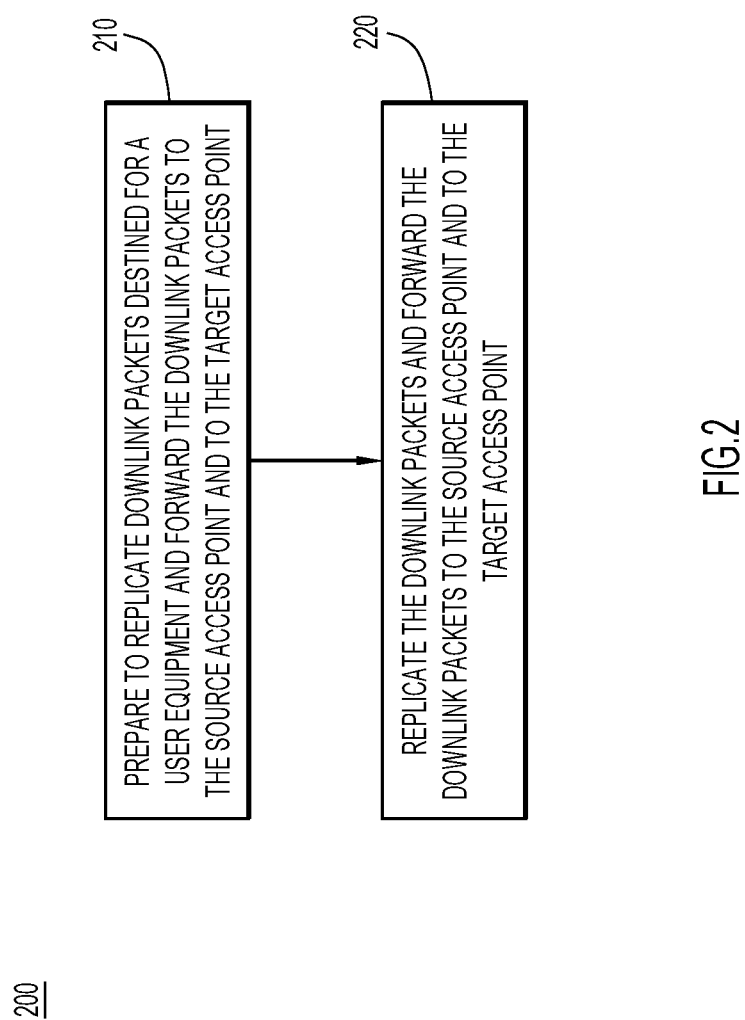
FIG. 2 illustrates a flowchart of a method for downlink packet replication to support an S1AP handover.

With continued reference to FIG. 1, FIG. 2 illustrates a flowchart of an example method 200 for downlink packet replication to support an S1AP handover. Method 200 may apply to either of handover scenarios 170(1) or 170(2). Operation 210 relates to handover preparation, and operation 220 relates to handover execution. More specifically, at operation 210, system 100 prepares to replicate downlink packets destined for UE 105 and forward the downlink packets to the source AP and to the target AP. At operation 220, system 100 replicates the downlink packets and forwards the downlink packets to the source AP and to the target AP.

Method 200 may be realized through any of at least three mechanisms to ensure zero (or near-zero) packet loss during S1AP handover. The first mechanism may involve packet replication on a fabric node that forwards the downlink packets to the source and target APs. The second and third mechanisms may involve packet replication on the source AP, which may utilize a tunnel (e.g., a data forwarding tunnel) to forward the downlink packets to the target AP. In one example, the first mechanism may be particularly advantageous because replication occurs on a fabric node (e.g., a network fabric switch) instead of involving the RAN elements (e.g., the source AP). However, it will be appreciated that all three mechanisms may be advantageous depending on the particular use case in which they are implemented.

More specifically, the first and second mechanisms may involve CTF 135 obtaining a notification that a handover is to occur for UE 105 from a source AP to a target AP; identifying an RLOC for a tunnel router associated with the source AP and an RLOC for a tunnel router associated with the target AP; and providing, to MS 140, a registration message including a mapping of an EID of UE 105 to the RLOC for the tunnel router associated with the source AP and the RLOC for the tunnel router associated with the target AP. Based on the registration message, MS 140 causes downlink packets destined for UE 105 to be replicated and provided to the source AP and to the target AP. As explained in greater detail below, the first mechanism may involve replication of downlink packets on a fabric node, and the second mechanism may involve replicating downlink packets on the source AP using the target AP as a secondary AP.

The third mechanism may involve CTF 135 obtaining a notification that a handover is to occur for UE 105 from the source AP to the target AP; providing, to the target AP, an identification of the source AP that causes the target AP to decapsulate encapsulated downlink packets destined for UE 105, where the encapsulated downlink packets destined for UE 105 are encapsulated with an outer header identifying the source AP as a source of the encapsulated downlink packets destined for UE 105 and further identifying the target AP as a destination of the encapsulated downlink packets destined for UE 105; and providing, to the source AP, an indication to replicate downlink packets destined for UE 105 to generate a first copy of the downlink packets destined for UE 105 and a second copy of the downlink packets destined for UE 105, and encapsulate the first copy of the downlink packets destined for UE 105 with the outer header to generate the encapsulated downlink packets destined for UE 105. Thus, as explained in greater detail below, the third mechanism may involve replicating downlink packets on the source AP using packet encapsulation. The third mechanism may also be referred to as "double encapsulation" because it may involve encapsulating downlink packets destined for UE 105 twice: the first layer of encapsulation to enable LISP routing and the second layer of encapsulation to enable the third mechanism.

Figure 3:
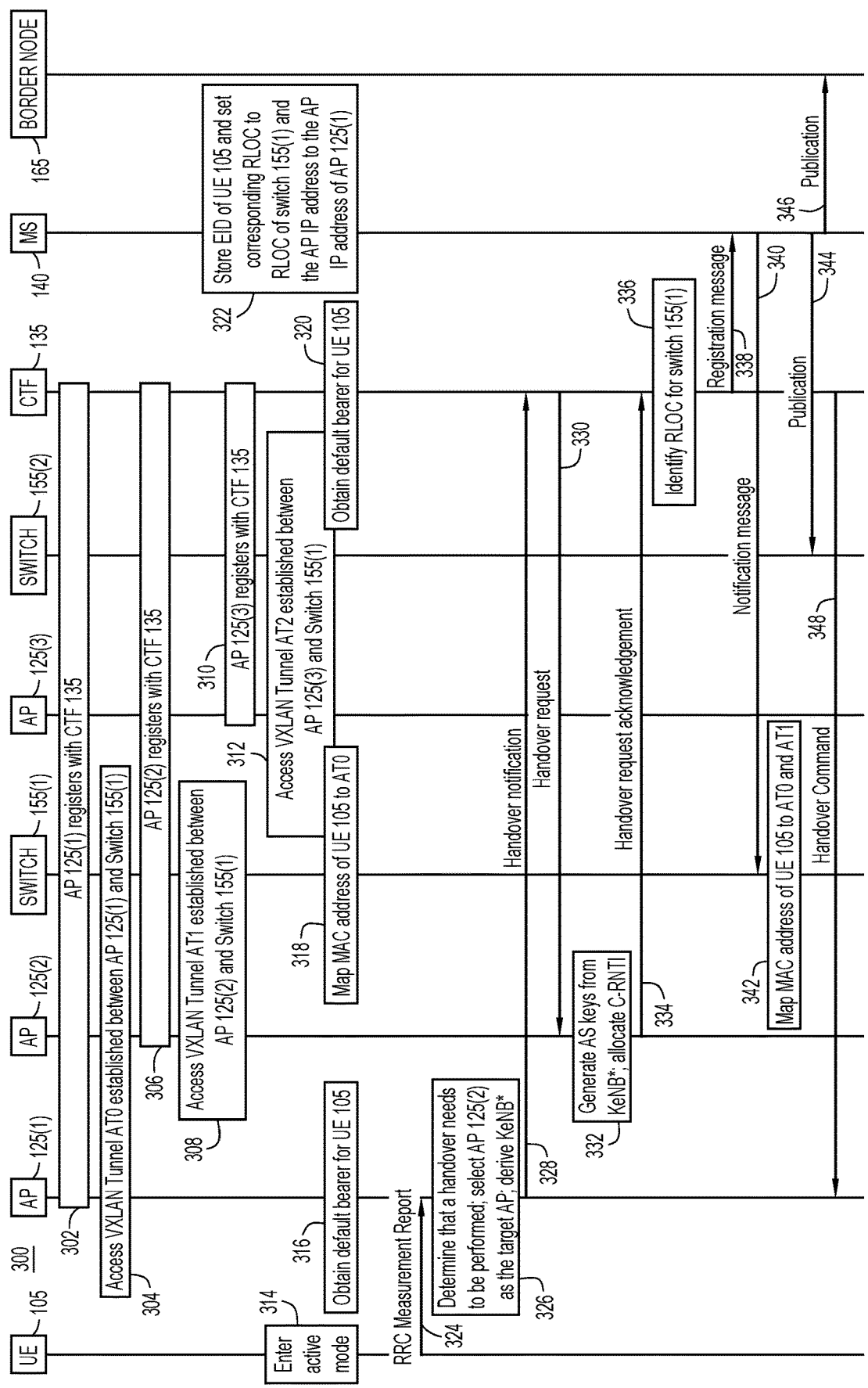
FIG. 3 illustrates a call flow diagram of a method of preparing for replication of downlink packets on a fabric node in an S1AP handover scenario in which a source Access Point (AP) and a target AP are associated with a single tunnel router, according to an example embodiment.
Figure 5:
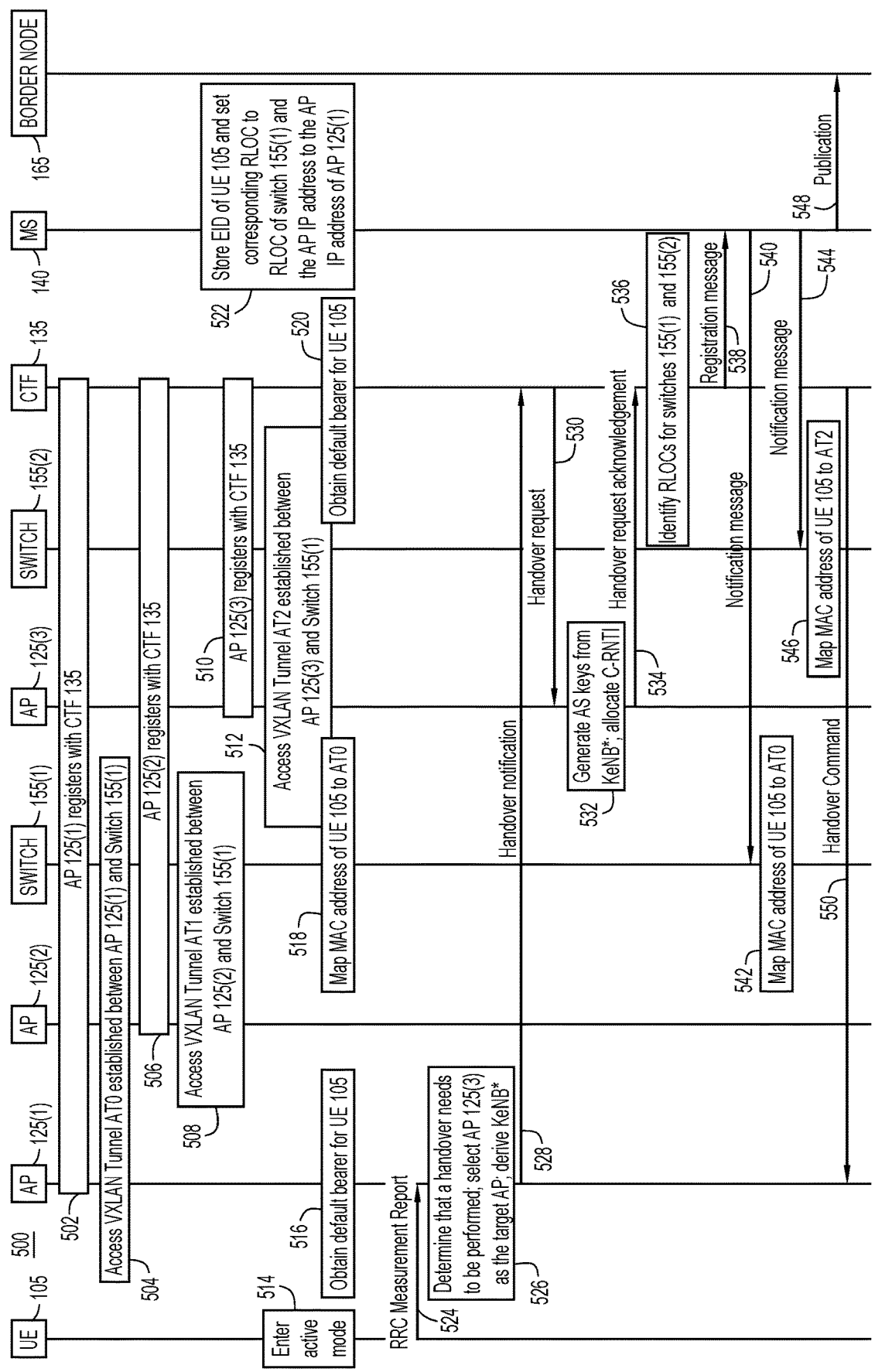
FIG. 5 illustrates a call flow diagram of a method of preparing for replication of downlink packets on a fabric node in an S1AP handover scenario in which a source AP and a target AP are associated with respective tunnel routers, according to an example embodiment.
Figure 6:
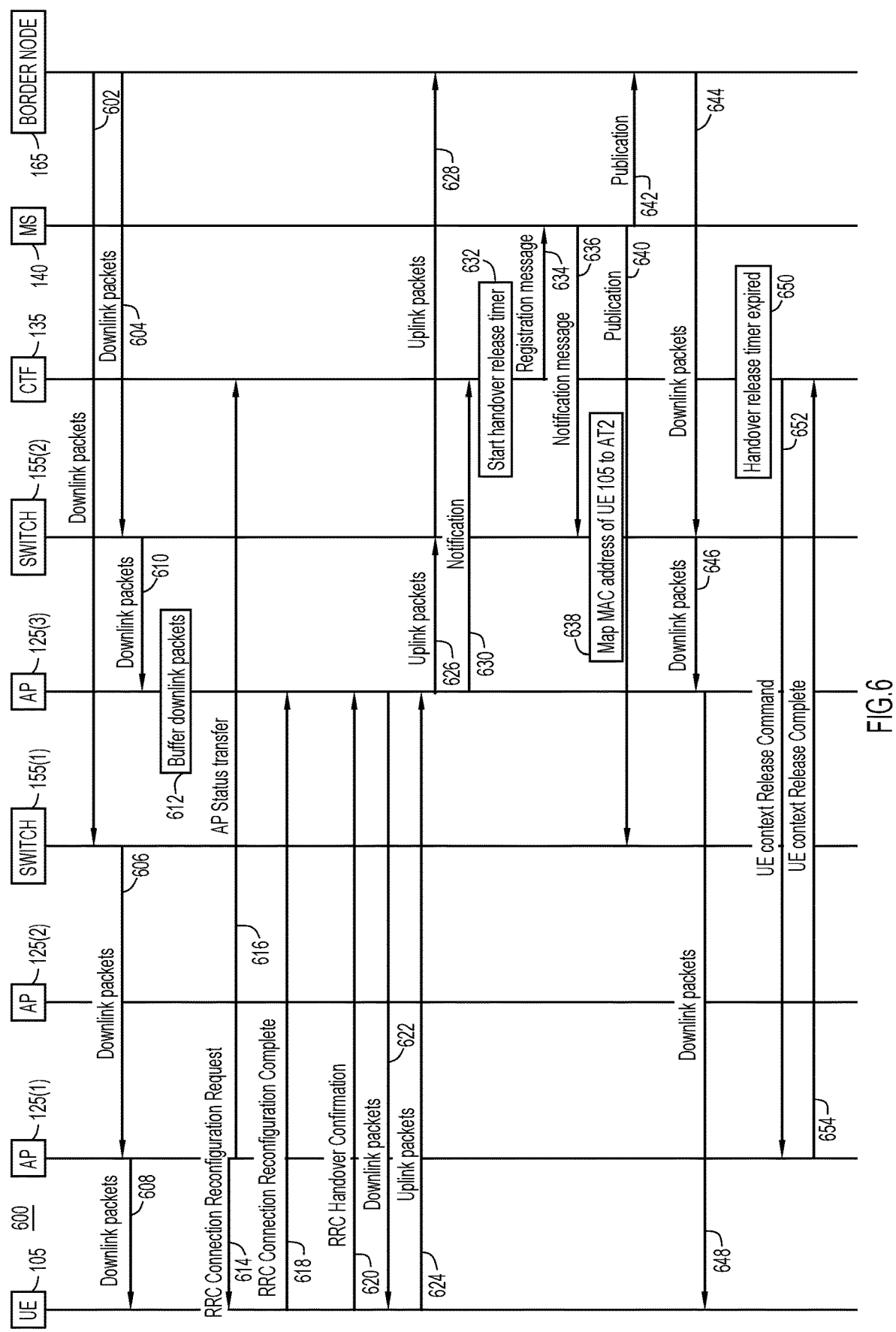
FIG. 6 illustrates a call flow diagram of a method for replicating downlink packets on a fabric node in an S1AP handover scenario in which a source AP and a target AP are associated with respective tunnel routers, according to an example embodiment.
Figure 7:
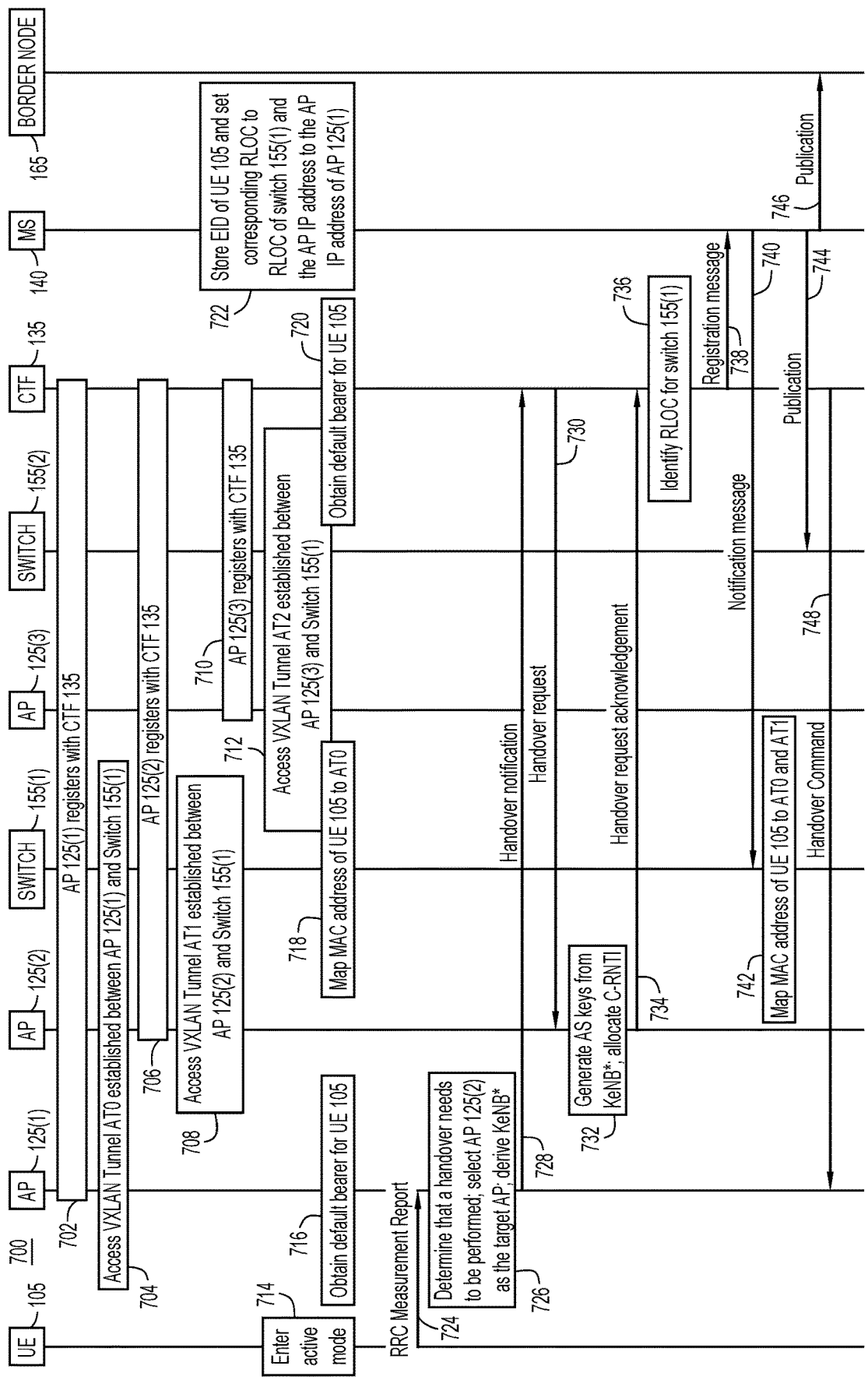
FIG. 7 illustrates a call flow diagram of a method of preparing for replication of downlink packets on a source AP using a target AP as a secondary AP in an S1AP handover scenario in which the source AP and the target AP are associated with a single tunnel router, according to an example embodiment.
Figure 9:
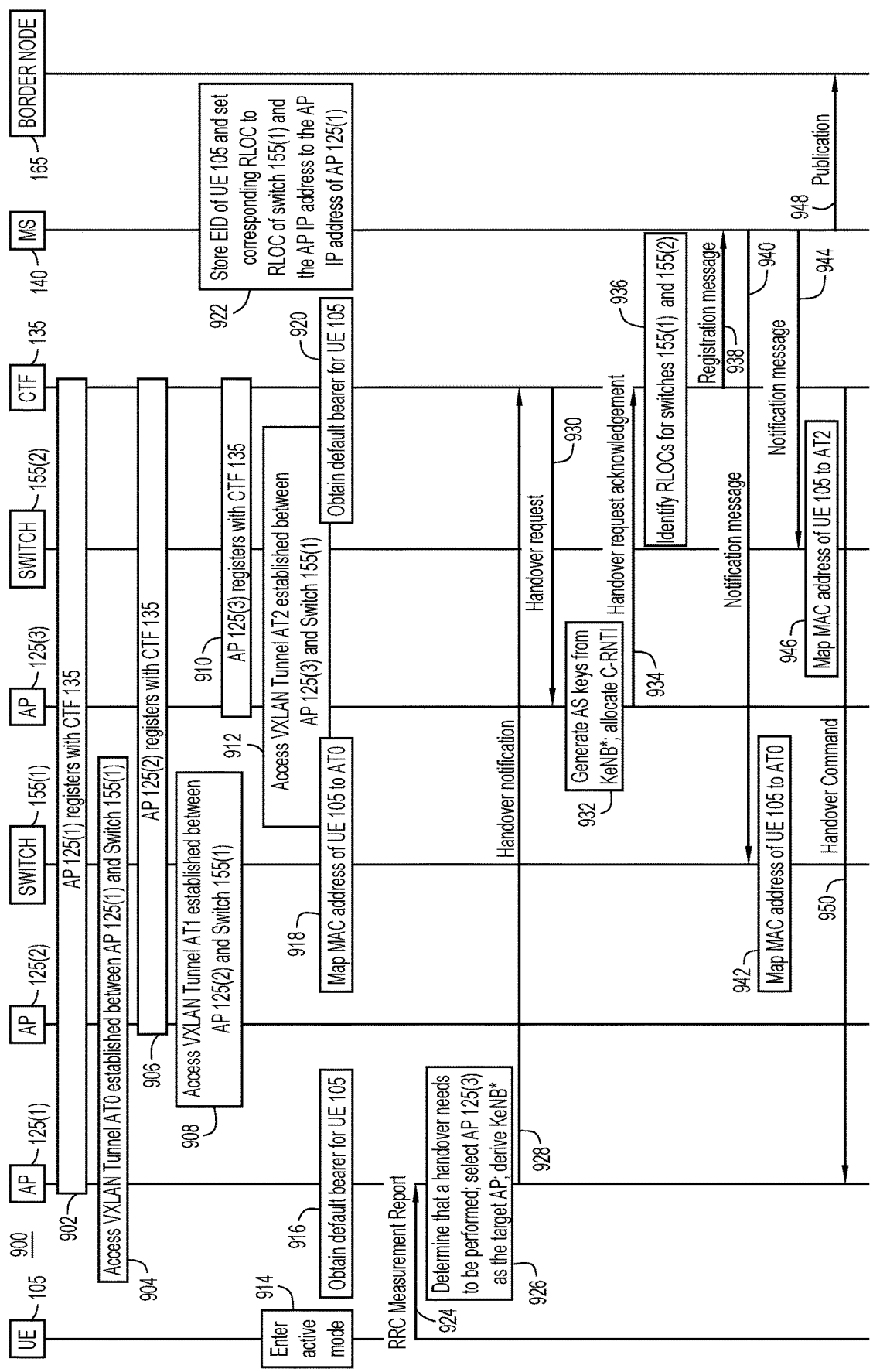
FIG. 9 illustrates a call flow diagram of a method of preparing for replication of downlink packets on a source AP using a target AP as a secondary AP in an S1AP handover scenario in which the source AP and a target AP are associated with respective tunnel routers, according to an example embodiment.
Figure 10:
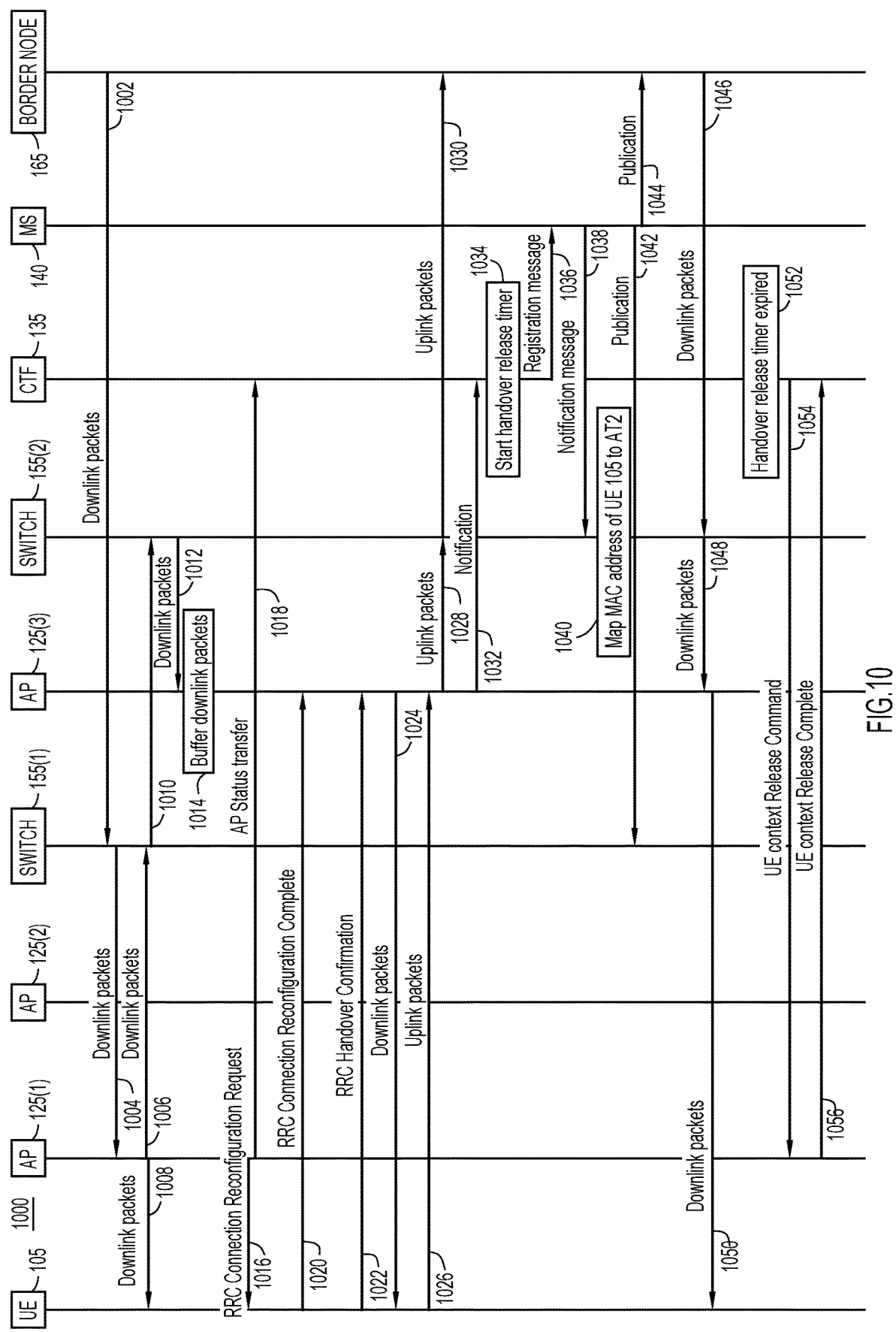
FIG. 10 illustrates a call flow diagram of a method for replicating downlink packets on a source AP using a target AP as a secondary AP in an S1AP handover scenario in which the source AP and a target AP are associated with respective tunnel routers, according to an example embodiment.
Figure 11:
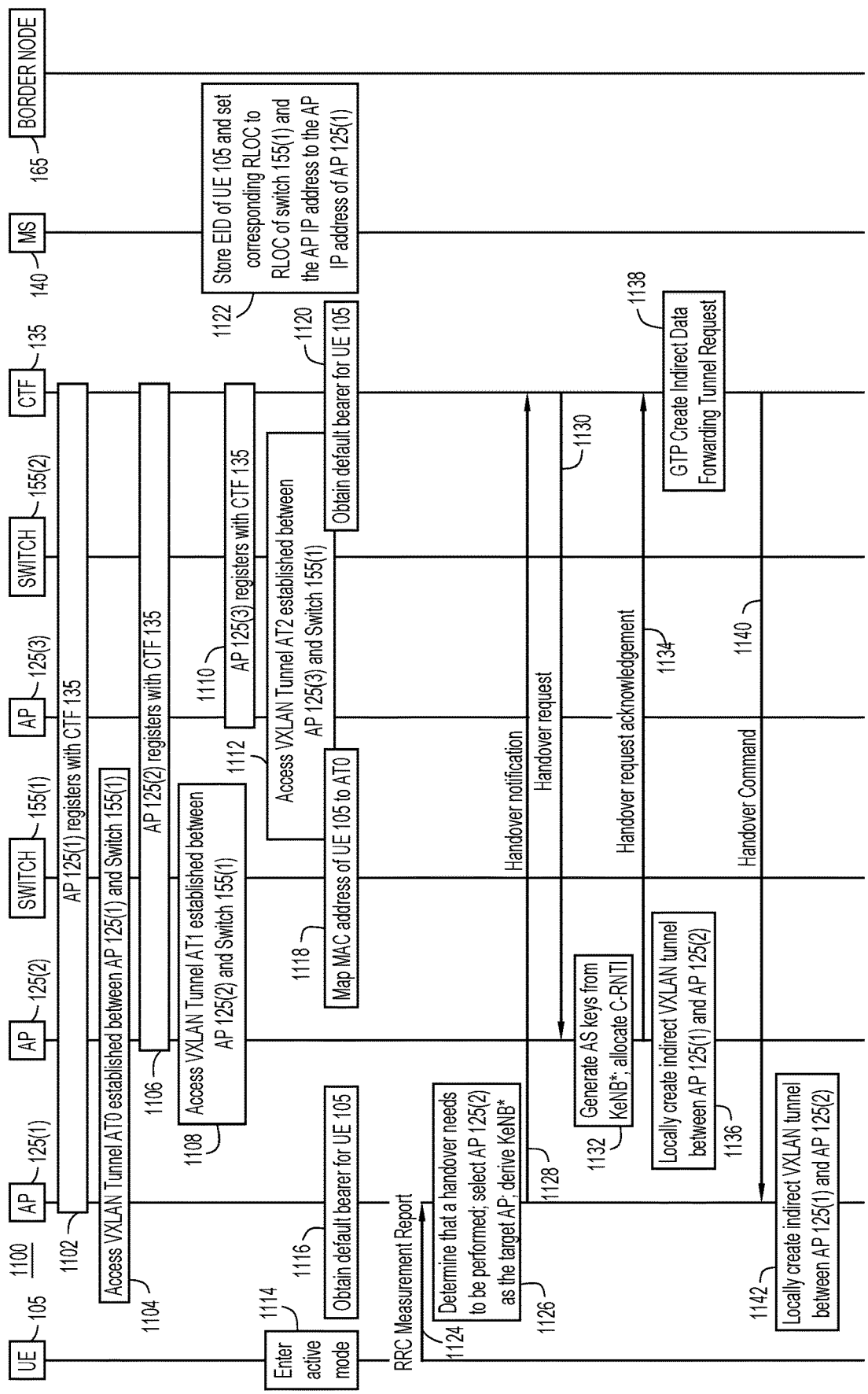
FIG. 11 illustrates a call flow diagram of a method of preparing for replication of downlink packets on a source AP using packet encapsulation in an S1AP handover scenario in which the source AP and a target AP are associated with a single tunnel router, according to an example embodiment.

With continued reference to FIGS. 1 and 2, FIGS. 3-6 illustrate call flows relating to the first mechanism(s), FIGS. 7-10 illustrate call flows relating to the second mechanism (s), and FIGS. 11-14 illustrate call flows relating to the third mechanism(s). FIGS. 3, 7, and 11 relate to operation 210 (handover preparation) in handover scenario 170(1), FIGS. 4, 8, and 12 relate to operation 220 (handover execution) in handover scenario 170(1), FIGS. 5, 9, and 13 relate to operation 210 (handover preparation) in handover scenario 170(2), and FIGS. 6, 10, and 14 relate to operation 220 (handover execution) in handover scenario 170(2).

FIG. 3 illustrates a call flow diagram of an example method 300 of handover preparation utilizing the first mechanism in handover scenario 170(1). At operation 302, AP 125(1) registers with CTF 135. At operation 304, an access Virtual Extensible Local Area Network (VXLAN) tunnel is established between AP 125(1) and switch 155(1). This access VXLAN tunnel may be referred to as "AT0." At operation 306, AP 125(2) registers with CTF 135. At operation 308, an access VXLAN tunnel is established between AP 125(2) and switch 155(1). This access VXLAN tunnel may be referred to as "AT" At operation 310, AP 125(3) registers with CTF 135. At operation 312, an access VXLAN tunnel is established between AP 125(3) and switch 155(1). This access VXLAN tunnel may be referred to as "AT2."

At operation 314, UE 105 enters active mode. At operation 316, AP 125(1) obtains the default bearer for UE 105. At operation 318, switch 155(1) maps the MAC address of UE 105 to AT0. This causes switch 155(1) to forward downlink packets with a destination address set to the MAC address of UE 105, over AT0 to AP 125(1). At operation 320, CTF 135 obtains the default bearer for UE 105. At operation 322, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 324, AP 125(1) obtains a Radio Resource Control (RRC) measurement report from UE 105. At operation 326, AP 125(1) determines that a handover needs to be performed, selects the target cell (e.g., selects AP 125(2) as the target AP), and derives KeNB* (in the 4G case). KeNB* is the transition key derived at the source AP (here, AP 125(1)) based on the current KeNB and the target Physical Cell ID (PCI). KeNB* is then passed to the target AP (here, AP 125(2)) to derive a new KeNB for use by the target AP (here, AP 125(2)). At operation 328, CTF 135 obtains a notification that a handover is to occur for UE 105 from AP 125(1) to AP 125(2). The notification may include, for example, an identification of AP 125(2), the target Tracking Area Identifier (TAI) for AP 125(2) (e.g., identifying tracking area 110), and a Source to Target Transparent Container.

The Source to Target Transparent Container permits the source AP (here, AP 125(1)) to send UE bearer information to the target AP (here, AP 125(2)). This operation may be transparent to CTF 135. At operation 330, CTF 135 provides, to AP 125(2), a handover request including the Source to Target Transparent Container. At operation 332, AP 125(2) generates Access Stratum (AS) keys from KeNB* and allocates a Cell Radio Network Temporary Identifier (C-RNTI) for UE 105. At operation 334, CTF 135 obtains a handover request acknowledgement from AP 125(2).

At operation 336, CTF 135 identifies the RLOC for the tunnel router associated with AP 125(1) and the RLOC for the tunnel router associated with AP 125(2). Because method 300 involves handover scenario 170(1), the tunnel router associated with AP 125(1) and the tunnel router associated with AP 125(2) are a single tunnel router, i.e., switch 155(1). Thus, CTF 135 identifies the RLOC for switch 155(1). At operation 338, CTF 135 provides a registration message (instead of a General Packet Radio Service (GPRS) Tunneling Protocol (GTP) Create Indirect Data Forwarding Tunnel Request) to MS 140. The registration message includes a mapping of the EID of UE 105 to the RLOC of switch 155(1). Thus, MS 140 has a single EID-to-RLOC mapping entry that maps the EID of UE 105 to the RLOC of switch 155(1).

The registration message further includes an indication for switch 155(1) to replicate downlink packets destined for UE 105 to generate a first copy of the downlink packets destined for UE 105 and a second copy of the downlink packets destined for UE 105, provide the first copy of the downlink packets destined for UE 105 to AP 125(1), and provide the second copy of the downlink packets destined for UE 105 to AP 125(2). The registration message may also include the IP address of AP 125(1) and the IP address of AP 125(2). In one specific example, the registration message may include a Layer 2 (L2) VXLAN Network ID (VNID), an EID set to the MAC address of UE 105, an RLOC set to the RLOC of switch 155(1), and a TLV identifying both the IP address of AP 125(1) and the IP address of AP 125(2) as well as the appropriate Security Group Tag (SGT).

Based on the registration message, MS 140 causes downlink packets destined for UE 105 to be replicated and provided to both AP 125(1) and AP 125(2). At operation 340, MS 140 provides, to switch 155(1), a notification message including the mapping of the EID of UE 105 to the RLOC of switch 155(1) and the indication for switch 155(1) to replicate downlink packets destined for UE 105 to generate the first copy of the downlink packets destined for UE 105 and the second copy of the downlink packets destined for UE 105, provide the first copy of the downlink packets destined for UE 105 to AP 125(1), and provide the second copy of the downlink packets destined for UE 105 to AP 125(2). In one specific example, MS 140 provides, to switch 155(1), a proxy notify message including the L2 VNID, the EID set to the MAC address of UE 105, the RLOC set to the RLOC of switch 155(1), and the TLV identifying both the IP address of AP 125(1) and the IP address of AP 125(2) as well as the appropriate SGT.

At operation 342, based on the notification message, switch 155(1) maps the MAC address of UE 105 to both AT0 and AT1. This causes switch 155(1) to replicate downlink packets destined for UE 105 to generate the first copy of the downlink packets destined for UE 105 and the second copy of the downlink packets destined for UE 105, provide the first copy of the downlink packets destined for UE 105 to AP 125(1), and provide the second copy of the downlink packets destined for UE 105 to AP 125(2). For L2-based LISP overlays, switch 155(1) creates forwarding entries with the virtual MAC (vMAC) address of UE 105 as reachable over both AT0 and AT1, with a replication rule enabled. For Layer 3 (L3) based LISP overlays, switch 155(1) may create forwarding entries with the EID (e.g., IP address) of UE 105 as reachable over both AT0 and AT1.

At operations 344 and 346, MS 140 provides publications to switch 155(2) and border node 165, respectively. The publications include the L2 VNID for the MAC address of UE 105 and the RLOC set to the RLOC of switch 155(1). At operation 348, CTF 135 provides a handover command to AP 125(1). At this point, border node 165 is configured to provide downlink packets destined for UE 105 to switch 155(1), which is configured to provide the downlink packets to APs 125(1) and 125(2). AP 125(1) is in turn configured to provide the downlink packets to UE 105, and AP 125(2) is configured to buffer the downlink packets.

Figure 4:
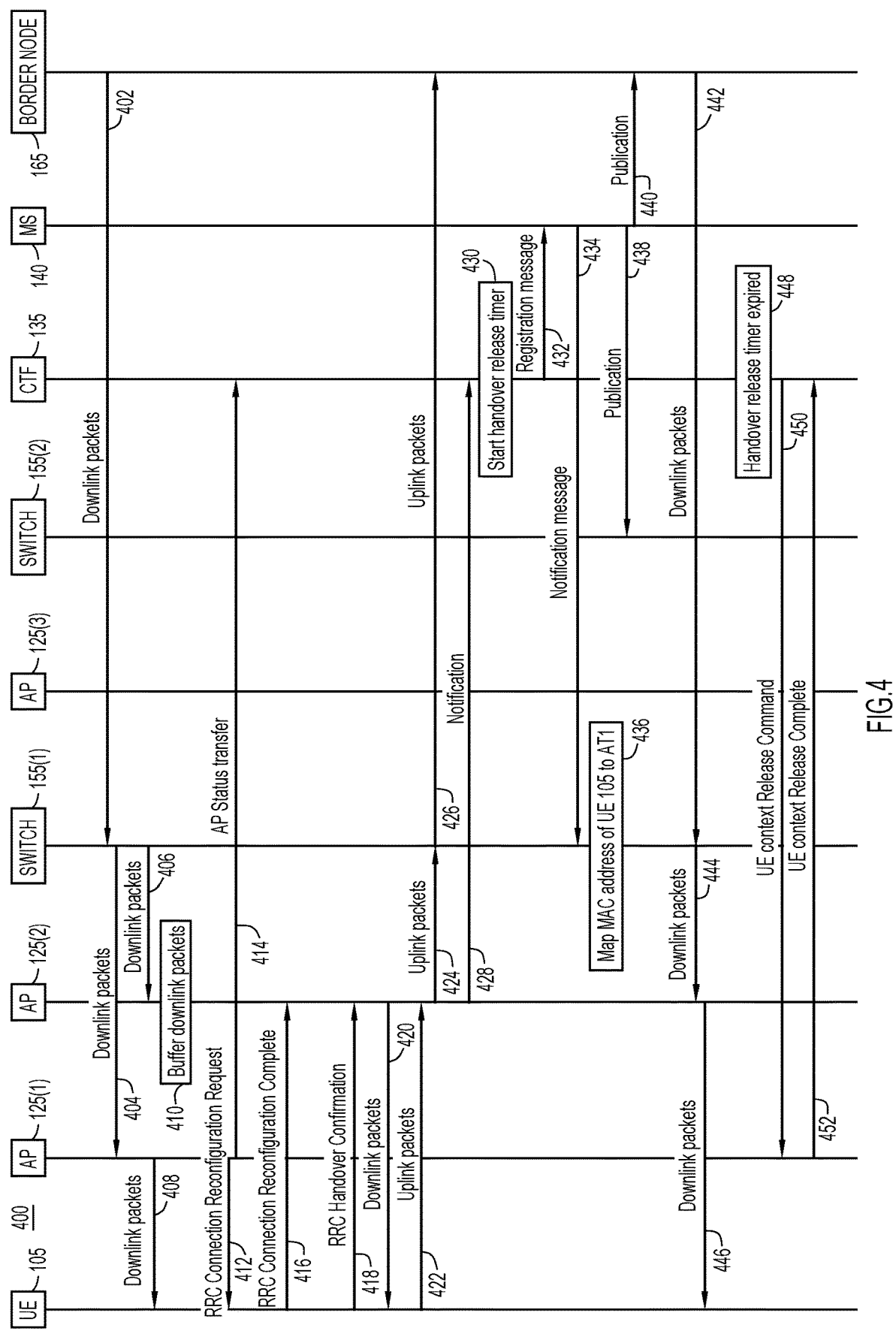
FIG. 4 illustrates a call flow diagram of a method for replicating downlink packets on a fabric node in an S1AP handover scenario in which a source AP and a target AP are associated with a single tunnel router, according to an example embodiment.

FIG. 4 illustrates a call flow diagram of an example method 400 of handover execution utilizing the first mechanism in handover scenario 170(1). Initially, border node 165 may obtain downlink packets from DN 120. The downlink packets may be destined for UE 105 (e.g., the downlink packets may identify the MAC or IP address of UE 105 as the destination addresses of the downlink packets). At operation 402, border node 165 provides (e.g., forwards) the downlink packets over a VXLAN tunnel to switch 155(1).

Based on the notification message, switch 155(1) replicates the downlink packets to generate a first copy of the downlink packets and a second copy of the downlink packets. At operation 404, switch 155(1) provides the first copy of the downlink packets to AP 125(1) over AT0, and at operation 406, switch 155(1) provides the second copy of the downlink packets to AP 125(2) over AT1. At operation 408, AP 125(1) provides the first copy of the downlink packets to UE 105. At operation 410, AP 125(2) buffers the second copy of the downlink packets until AP 125(2) obtains a handover confirmation from UE 105.

At operation 412, AP 125(1) provides an RRC Connection Reconfiguration Request to UE 105. At operation 414, CTF 135 obtains an AP status transfer from AP 125(1). At operation 416, AP 125(2) obtains an indication that the RRC connection reconfiguration is complete. The indication may include the target C-RNTI. At operation 418, AP 125(2) obtains the handover confirmation from UE 105, and the handover procedure is complete. At this point, AP 125(2) is configured to forward the buffered downlink packets to UE 105 and obtain uplink packets from UE 105.

At operation 420, AP 125(2) forwards the buffered downlink packets to UE 105. Thus, UE 105 obtains downlink packets from both AP 125(1) and AP 125(2) during the handover procedure to help ensure that no downlink packets are lost. If UE 105 obtains identical copies of a given downlink packet, UE 105 may simply drop one of the identical copies. At operation 422, AP 125(2) obtains the uplink packets from UE 105. The uplink packets may be destined for DN 120. At operation 424, switch 155(1) may obtain the uplink packets from AP 125(2). At operation 426, switch 155(1) may provide the uplink packets to border node 165, which may in turn provide the uplink packets to DN 120.

At operation 428, CTF 135 obtains a notification that the handover has occurred from AP 125(2). At operation 430, CTF 135 starts a handover release timer. At operation 432, CTF 135 provides a registration message (instead of a modify bearer request) to MS 140. The registration message includes a mapping of the EID of UE 105 to the RLOC of switch 155(1). The registration message further includes an indication that the RLOC of switch 155(1) is associated with AP 125(2). In one specific example, the registration message may include a L2 VNID, an EID set to the MAC address of UE 105, an RLOC set to the RLOC of switch 155(1), and a TLV identifying the IP address of AP 125(2) and the appropriate SGT.

At operation 434, based on the registration message, MS 140 provides, to switch 155(1), a notification message including the mapping of the EID of UE 105 to the RLOC of switch 155(1) and an indication for switch 155(1) to provide downlink packets destined for UE 105 to AP 125(2). In one specific example, MS 140 provides, to switch 155(1), a proxy notify message including the L2 VNID, the EID set to the MAC address of UE 105, the RLOC set to the RLOC of switch 155(1), and the TLV identifying the IP address of AP 125(2) and the appropriate SGT. At operation 436, based on the notification message, switch 155(1) maps the MAC address of UE 105 to AT1. This causes switch 155(1) to forward downlink packets destined for UE 105 to AP 125(2).

At operations 438 and 440, MS 140 provides publications to switch 155(2) and border node 165, respectively. The publications include the L2 VNID for the MAC address of UE 105 and the RLOC set to the RLOC of switch 155(1). At operation 442, switch 155(1) obtains, from border node 165, downlink packets destined for UE 105. At operation 444, switch 155(1) provides, to AP 125(2), the downlink packets destined for UE 105. At operation 446, AP 125(2) provides the downlink packets to UE 105. At operation 448, CTF 135 determines that the handover release timer has expired. At operation 450, in response to the handover release timer expiring, CTF 135 provides a UE context release command to AP 125(1). At operation 452, CTF 135 obtains a UE context release complete message from AP 125(1).

FIG. 5 illustrates a call flow diagram of an example method 500 of handover preparation utilizing the first mechanism in handover scenario 170(2). At operation 502, AP 125(1) registers with CTF 135. At operation 504, access VXLAN tunnel AT0 is established between AP 125(1) and switch 155(1). At operation 506, AP 125(2) registers with CTF 135. At operation 508, access VXLAN tunnel AT1 is established between AP 125(2) and switch 155(1). At operation 510, AP 125(3) registers with CTF 135. At operation 512, access VXLAN tunnel AT2 is established between AP 125(3) and switch 155(1).

At operation 514, UE 105 enters active mode. At operation 516, AP 125(1) obtains the default bearer for UE 105. At operation 518, switch 155(1) maps the MAC address of UE 105 to AT0. This causes switch 155(1) to forward downlink packets with a destination address set to the MAC address of UE 105, over AT0 to AP 125(1). At operation 520, CTF 135 obtains the default bearer for UE 105. At operation 522, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 524, AP 125(1) obtains an RRC measurement report from UE 105. At operation 526, AP 125(1)

determines that a handover needs to be performed, selects the target cell (e.g., selects AP 125(3) as the target AP), and derives KeNB* (in the 4G case). At operation 528, CTF 135 obtains a notification that a handover is to occur for UE 105 from AP 125(1) to AP 125(3). The notification may include, for example, an identification of AP 125(3), the target TAI for AP 125(3) (e.g., identifying tracking area 110), and a Source to Target Transparent Container. At operation 530, CTF 135 provides, to AP 125(3), a handover request including the Source to Target Transparent Container. At operation 532, AP 125(3) generates AS keys from KeNB* and allocates a C-RNTI for UE 105. At operation 534, CTF 135 obtains a handover request acknowledgement from AP 125(3).

At operation 536, CTF 135 identifies the RLOC for the tunnel router associated with AP 125(1) and the RLOC for the tunnel router associated with AP 125(3). Because method 500 involves handover scenario 170(2), the tunnel router associated with AP 125(1) (i.e., switch 155(1)) is different from the tunnel router associated with AP 125(3) (i.e., switch 155(2)). Thus, CTF 135 identifies the RLOCs for switches 155(1) and 155(2). At operation 538, CTF 135 provides a registration message (instead of a GTP Create Indirect Data Forwarding Tunnel Request) to MS 140. The registration message includes a mapping of the EID of UE 105 to the RLOC of switch 155(1) and the RLOC of switch 155(2). Thus, MS 140 has multiple EID-to-RLOC bindings for UE 105. In particular, the EID of UE 105 may be mapped both to the RLOC of switch 155(1) and the RLOC of switch 155(2).

The registration message further includes an indication for border node 165 to replicate downlink packets destined for UE 105 to generate a first copy of the downlink packets destined for UE 105 and a second copy of the downlink packets destined for UE 105, provide the first copy of the downlink packets destined for UE 105 to switch 155(1), and provide the second copy of the downlink packets destined for UE 105 to switch 155(2). The registration message may also include the IP address of AP 125(1) and the IP address of AP 125(3). In one specific example, the registration message may include a L2 VNID, an EID set to the MAC address of UE 105, an RLOC set to the RLOC of switch 155(1), a TLV associated with the RLOC of switch 155(1) that identifies both the IP address of AP 125(1) and a corresponding SGT, an RLOC set to the RLOC of switch 155(2), and a TLV associated with the RLOC of switch 155(2) that identifies both the IP address of AP 125(3) and a corresponding SGT.

Based on the registration message, MS 140 causes downlink packets destined for UE 105 to be replicated and provided to both AP 125(1) and AP 125(3). At operation 540, MS 140 provides a notification message to switch 155(1). In one specific example, MS 140 provides a proxy notify message including the L2 VNID for the MAC address of UE 105, the RLOC set to the RLOC of switch 155(1) and the TLV associated with the RLOC of switch 155(1) that identifies both the IP address of AP 125(1) and the corresponding SGT. At operation 542, based on the notification message, switch 155(1) maps the MAC address of UE 105 to AT0. This causes switch 155(1) to forward downlink packets destined for UE 105 to AP 125(1). For L2-based LISP overlays, switch 155(1) creates forwarding entries with the vMAC address of UE 105 as reachable over AT0. For L3 based LISP overlays, switch 155(1) may create forwarding entries with the EID (e.g., IP address) of UE 105 as reachable over AT0.

At operation 544, MS 140 provides a notification message to switch 155(2). In one specific example, MS 140 provides a proxy notify message including the L2 VNID for the MAC address of UE 105, the RLOC set to the RLOC of switch 155(2) and the TLV associated with the RLOC of switch 155(2) that identifies both the IP address of AP 125(3) and the corresponding SGT. At operation 546, based on the notification message, switch 155(2) maps the MAC address of UE 105 to AT2. This causes switch 155(2) to forward downlink packets destined for UE 105 to AP 125(3). For L2-based LISP overlays, switch 155(2) creates forwarding entries with the vMAC address of UE 105 as reachable over AT2. For L3 based LISP overlays, switch 155(2) may create forwarding entries with the EID (e.g., IP address) of UE 105 as reachable over AT2.

At operation 548, MS 140 provides, to border node 165, a publication including the mapping of the EID of UE 105 to the RLOCs of switches 155(1) and 155(2) and the indication for border node 165 to replicate downlink packets destined for UE 105 to generate the first copy of the downlink packets destined for UE 105 and the second copy of the downlink packets destined for UE 105, provide the first copy of the downlink packets destined for UE 105 to switch 155(1), and provide the second copy of the downlink packets destined for UE 105 to switch 155(2). In one specific example, the publication includes the L2 VNID for the MAC address of UE 105 and the RLOC set to both the RLOC of switch 155(1) and the RLOC of switch 155(2).

This causes border node 165 to replicate downlink packets destined for UE 105 to generate the first copy of the downlink packets destined for UE 105 and the second copy of the downlink packets destined for UE 105, provide the first copy of the downlink packets destined for UE 105 to switch 155(1), and provide the second copy of the downlink packets destined for UE 105 to switch 155(2). Thus, at this point, border node 165 is configured to provide downlink packets destined for UE 105 to switches 155(1) and 155(2). Switch 155(1) is configured to provide the downlink packets to AP 125(1), which is in turn configured to provide the downlink packets to UE 105. Switch 155(2) is configured to provide the downlink packets to AP 125(3), which is in turn configured to buffer the downlink packets. At operation 550, CTF 135 provides a handover command to AP 125(1).

FIG. 6 illustrates a call flow diagram of an example method 600 of handover execution utilizing the first mechanism in handover scenario 170(2). Initially, border node 165 may obtain downlink packets from DN 120. The downlink packets may be destined for UE 105 (e.g., the downlink packets may identify the MAC or IP address of UE 105 as the destination addresses of the downlink packets). Based on the publication, border node 165 replicates the downlink packets to generate a first copy of the downlink packets and a second copy of the downlink packets. At operation 602, border node 165 provides (e.g., forwards) the first copy of the downlink packets to switch 155(1) over AT0, and at operation 604, border node 165 provides (e.g., forwards) the second copy of the downlink packets to switch 155(2) over AT2. At operation 606, switch 155(1) provides the first copy of the downlink packets to AP 125(1), and at operation 608, AP 125(1) provides the first copy of the downlink packets to UE 105. At operation 610, switch 155(2) provides the second copy of the downlink packets to AP 125(3), and at operation 612, AP 125(3) buffers the second copy of the downlink packets until AP 125(3) obtains a handover confirmation from UE 105.

At operation 614, AP 125(1) provides an RRC Connection Reconfiguration Request to UE 105. At operation 616, CTF 135 obtains an AP status transfer from AP 125(1). At operation 618, AP 125(3) obtains an indication that the RRC connection reconfiguration is complete. The indication may include the target C-RNTI. At operation 620, AP 125(3) obtains the handover confirmation from UE 105, and the handover procedure is complete. At this point, AP 125(3) is configured to forward the buffered downlink packets to UE 105 and obtain uplink packets from UE 105.

At operation 622, AP 125(3) forwards the buffered downlink packets to UE 105. Thus, UE 105 obtains downlink packets from both AP 125(1) and AP 125(3) during the handover procedure to help ensure that no downlink packets are lost. If UE 105 obtains identical copies of a given downlink packet, UE 105 may simply drop one of the identical copies. At operation 624, AP 125(3) obtains the uplink packets from UE 105. The uplink packets may be destined for DN 120. At operation 626, switch 155(2) may obtain the uplink packets from AP 125(3). At operation 628, switch 155(2) may provide the uplink packets to border node 165, which may in turn provide the uplink packets to DN 120.

At operation 630, CTF 135 obtains a notification that the handover has occurred from AP 125(3). At operation 632, CTF 135 starts a handover release timer. At operation 634, CTF 135 provides a registration message (instead of a modify bearer request) to MS 140. The registration message includes a mapping of the EID of UE 105 to the RLOC of switch 155(2). The registration message further includes an indication that the RLOC of switch 155(2) is associated with AP 125(3). In one specific example, the registration message may include a L2 VNID, an EID set to the MAC address of UE 105, an RLOC set to the RLOC of switch 155(2), and a TLV identifying the IP address of AP 125(3) and the appropriate SGT.

At operation 636, based on the registration message, MS 140 provides, to switch 155(2), a proxy notify message including the L2 VNID for the MAC address of UE 105, the EID set to the MAC address of UE 105, the RLOC set to the RLOC of switch 155(2), and a TLV identifying the IP address of AP 125(3) and the appropriate SGT. At operation 638, switch 155(2) maps the MAC address of UE 105 to AT2. This causes switch 155(1) to forward downlink packets destined for UE 105 to AP 125(3). At operation 640, MS 140 provides, to switch 155(1), a publication that includes the L2 VNID for the MAC address of UE 105 and the RLOC set to the RLOC of switch 155(2).

At operation 642, based further on the registration message, MS 140 provides, to border node 165, a publication including the mapping of the EID of UE 105 to the RLOC of switch 155(2) and an indication for border node 165 to provide downlink packets destined for UE 105 to switch 155(2). In one specific example, MS 140 provides, to border node 165, a publication including the L2 VNID for the MAC address of UE 105 and the RLOC set to the RLOC of switch 155(2).

At operation 644, based on the publication, border node 165 provides downlink packets destined for UE 105 to switch 155(2). At operation 646, switch 155(2) provides, to AP 125(3), the downlink packets destined for UE 105. At operation 648, AP 125(3) provides the downlink packets to UE 105. At operation 650, CTF 135 determines that the handover release timer has expired. At operation 652, in response to the handover release timer expiring, CTF 135 provides a UE context release command to AP 125(1). At operation 654, CTF 135 obtains a UE context release complete message from AP 125(1).

FIG. 7 illustrates a call flow diagram of an example method 700 of handover preparation utilizing the second mechanism in handover scenario 170(1). At operation 702, AP 125(1) registers with CTF 135. At operation 704, access VXLAN tunnel AT0 is established between AP 125(1) and switch 155(1). At operation 706, AP 125(2) registers with CTF 135. At operation 708, access VXLAN tunnel AT1 is established between AP 125(2) and switch 155(1). At operation 710, AP 125(3) registers with CTF 135. At operation 712, access VXLAN tunnel AT2 is established between AP 125(3) and switch 155(1).

At operation 714, UE 105 enters active mode. At operation 716, AP 125(1) obtains the default bearer for UE 105. At operation 718, switch 155(1) maps the MAC address of UE 105 to AT0. This causes switch 155(1) to forward downlink packets with a destination address set to the MAC address of UE 105, over AT0 to AP 125(1). At operation 720, CTF 135 obtains the default bearer for UE 105. At operation 722, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 724, AP 125(1) obtains an RRC measurement report from UE 105. At operation 726, AP 125(1) determines that a handover needs to be performed, selects the target cell (e.g., selects AP 125(2) as the target AP), and derives KeNB* (in the 4G case). At operation 728, CTF 135 obtains a notification that a handover is to occur for UE 105 from AP 125(1) to AP 125(2). The notification may include, for example, an identification of AP 125(2), the target TAI for AP 125(2) (e.g., identifying tracking area 110), and a Source to Target Transparent Container. At operation 730, CTF 135 provides, to AP 125(2), a handover request including the Source to Target Transparent Container. At operation 732, AP 125(2) generates AS keys from KeNB* and allocates a C-RNTI for UE 105. At operation 734, CTF 135 obtains a handover request acknowledgement from AP 125(2).

At operation 736, CTF 135 identifies the RLOC for the tunnel router associated with AP 125(1) and the RLOC for the tunnel router associated with AP 125(2). Because method 700 involves handover scenario 170(1), the tunnel router associated with AP 125(1) and the tunnel router associated with AP 125(2) are a single tunnel router, i.e., switch 155(1). Thus, CTF 135 identifies the RLOC for switch 155(1). At operation 738, CTF 135 provides a registration message (instead of a GTP Create Indirect Data Forwarding Tunnel Request) to MS 140. The registration message includes a mapping of the EID of UE 105 to the RLOC of switch 155(1). Thus, MS 140 has a single EID-to-RLOC mapping entry that maps the EID of UE 105 to the RLOC of switch 155(1).

The registration message further includes an indication that the AP 125(2) is a secondary AP. A secondary AP may be an AP that is designated for use when a primary AP cannot or should not be used, for example, when a downlink packet destined for a UE is received from the primary AP.

When that occurs, it may be assumed that the primary AP, for any given reason, cannot forward the downlink packet to the UE. As such, when the downlink packet is received from the primary AP, the downlink packet may be forwarded to the secondary AP, ad may thereby reach the UE via the secondary AP instead of the primary AP.

Here, AP 125(2) is indicated as being the secondary AP and AP 125(1) is by default the primary AP. Thus, the registration message includes an indication that AP 125(2) is a secondary AP to which switch 155(1) is to provide any downlink packets destined for UE 105 that are obtained from AP 125(1). In one specific example, the registration message may include an L2 VNID, an EID set to the MAC address of UE 105, an RLOC set to the RLOC of switch 155(1), and a TLV identifying the IP address of AP 125(2) and providing a flag that the AP 125(2) is a secondary AP.

Based on the registration message, MS 140 causes downlink packets destined for UE 105 to be replicated and provided to both AP 125(1) and AP 125(2). At operation 740, MS 140 provides, to switch 155(1), a notification message including the mapping of the EID of UE 105 to the RLOC of switch 155(1) and the indication that the AP 125(2) is the secondary AP. In one specific example, MS 140 provides, to switch 155(1), a proxy notify message including the L2 VNID, the EID set to the MAC address of UE 105, the RLOC set to the RLOC of switch 155(1), and a TLV identifying the IP address of AP 125(2) and providing a flag that the AP 125(2) is a secondary AP.

At operation 742, based on the notification message, switch 155(1) maps the MAC address of UE 105 to both AT0 and AT1. This causes switch 155(1) to provide downlink packets destined for UE 105 to AP 125(1) over AT0, and further causes switch 155(1) to provide any downlink packets obtained from AP 125(1) over AT0 to AP 125(2) over AT1. For L2-based LISP overlays, switch 155(1) creates forwarding entries with the vMAC address of UE 105 as reachable over both AT0 (designated as the primary access VXLAN tunnel) and AT1 (designated as the secondary access VXLAN tunnel). For L3-based LISP overlays, switch 155(1) may create forwarding entries with the EID (e.g., IP address) of UE 105 as reachable over both AT0 (designated as the primary access VXLAN tunnel or primary path) and AT1 (designated as the secondary access VXLAN tunnel or secondary path). Thus, upon receiving a downlink packet that has an L2 MAC address matching the vMAC address entry (in the L2 case) or a destination IP address matching the EID of UE 105, switch 155(1) is configured to send that downlink packet to AP 125(1) by default, because AP 125(1) is the primary AP. But if the downlink packet is received from AP 125(1), switch 155(1) is configured to send the downlink packet to AP 125(2), because AP 125(2) is the secondary AP.

At operations 744 and 746, MS 140 provides publications to switch 155(2) and border node 165, respectively. The publications include the L2 VNID for the MAC address of UE 105 and the RLOC set to the RLOC of switch 155(1). Thus, MS 140 delivers the single EID-to-RLOC mapping entry to switch 155(2) and border node 165. At operation 748, CTF 135 provides a handover command to AP 125(1). At this point, border node 165 is configured to provide downlink packets destined for UE 105 to switch 155(1) over AT0. Switch 155(1) is in turn configured to provide the downlink packets to AP 125(1) by default (e.g., if the downlink packets are obtained from border node 165), and to AP 125(2) if the downlink packets destined for UE 105 are obtained from AP 125(1).

Figure 8:
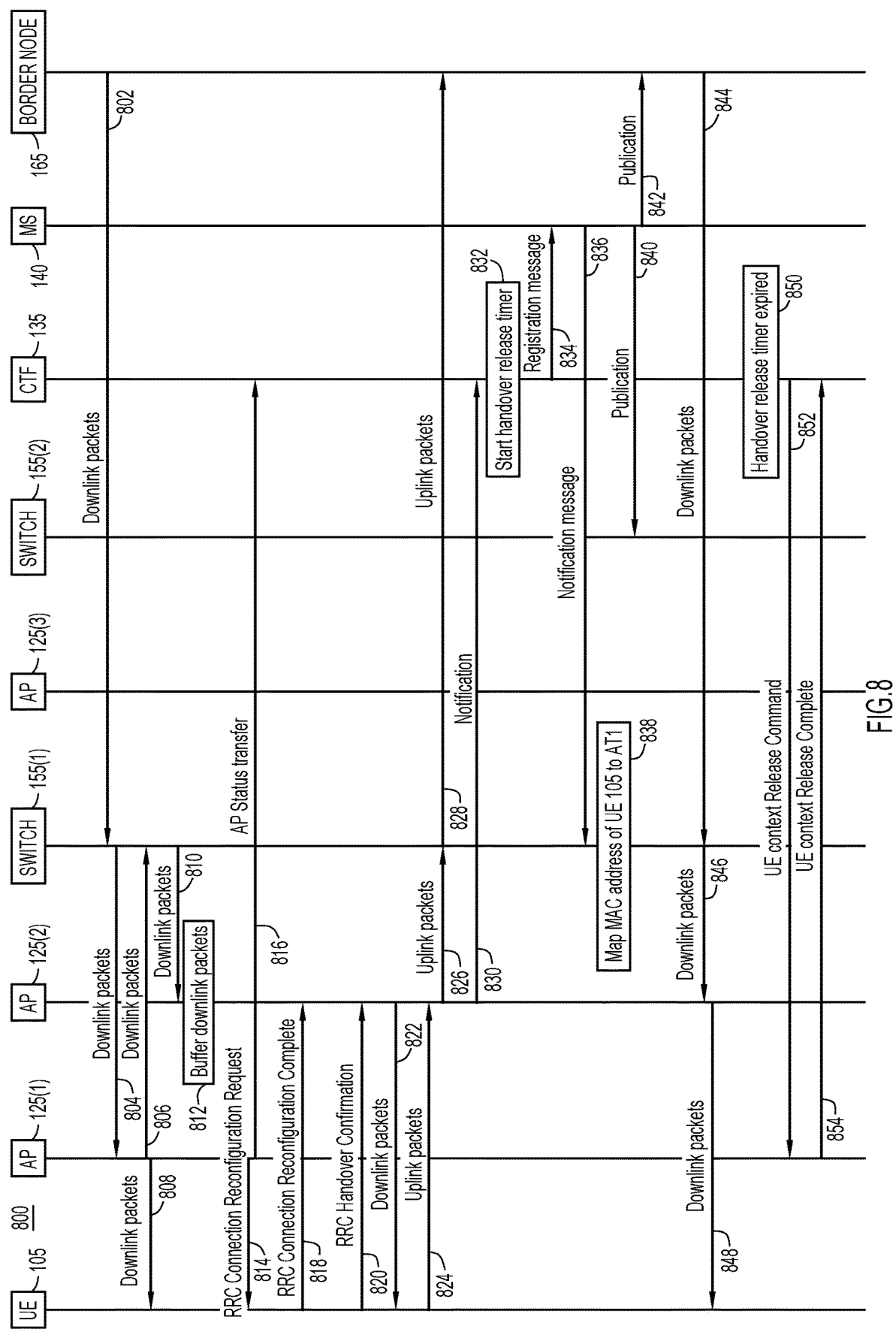
FIG. 8 illustrates a call flow diagram of a method for replicating downlink packets on a source AP using a target AP as a secondary AP in an S1AP handover scenario in which the source AP and a target AP are associated with a single tunnel router, according to an example embodiment.

FIG. 8 illustrates a call flow diagram of an example method 800 for handover execution utilizing the second mechanism in handover scenario 170(1). Initially, border node 165 may obtain downlink packets from DN 120. The downlink packets may be destined for UE 105 (e.g., the downlink packets may identify the MAC or IP address of UE 105 as the destination addresses of the downlink packets). At operation 802, border node 165 provides (e.g., forwards) the downlink packets over a VXLAN tunnel to switch 155(1). At operation 804, switch 155(1) provides the downlink packets destined for UE 105 to AP 125(1).

At operation 806, AP 125(1) replicates the downlink packets to generate a first copy of the downlink packets and a second copy of the downlink packets, and provides the first copy of the downlink packets to switch 155(1) over AT0. At operation 808, AP 125(1) provides the second copy of the downlink packets to UE 105. At operation 810, based on the notification message, switch 155(1) provides (e.g., forwards) the first copy of the downlink packets to AP 125(2) over AT1. At operation 812, AP 125(2) buffers the second copy of the downlink packets until AP 125(2) obtains a handover confirmation from UE 105.

At operation 814, AP 125(1) provides an RRC Connection Reconfiguration Request to UE 105. At operation 816, CTF 135 obtains an AP status transfer from AP 125(1). At operation 818, AP 125(2) obtains an indication that the RRC connection reconfiguration is complete. The indication may include the target C-RNTI. At operation 820, AP 125(2) obtains the handover confirmation from UE 105, and the handover procedure is complete. At this point, AP 125(2) is configured to forward the buffered downlink packets to UE 105 and obtain uplink packets from UE 105.

At operation 822, AP 125(2) forwards the buffered downlink packets to UE 105. Thus, UE 105 obtains downlink packets from both AP 125(1) and AP 125(2) during the handover procedure to help ensure that no downlink packets are lost. If UE 105 obtains identical copies of a given downlink packet, UE 105 may simply drop one of the identical copies. At operation 824, AP 125(2) obtains the uplink packets from UE 105. The uplink packets may be destined for DN 120. At operation 826, switch 155(1) may obtain the uplink packets from AP 125(2). At operation 828, switch 155(1) may provide the uplink packets to border node 165, which may in turn provide the uplink packets to DN 120.

At operation 830, CTF 135 obtains a notification that the handover has occurred from AP 125(2). At operation 832, CTF 135 starts a handover release timer. At operation 834, CTF 135 provides a registration message (instead of a modify bearer request) to MS 140. The registration message includes a mapping of the EID of UE 105 to the RLOC of switch 155(1). The registration message further includes an indication that the RLOC of switch 155(1) is associated with AP 125(2). In one specific example, the registration message may include a L2 VNID, an EID set to the MAC address of UE 105, an RLOC set to the RLOC of switch 155(1), and a TLV identifying the IP address of AP 125(2) and the appropriate SGT.

At operation 836, based on the registration message, MS 140 provides, to switch 155(1), a notification message including the mapping of the EID of UE 105 to the RLOC of switch 155(1) and an indication for switch 155(1) to provide downlink packets destined for UE 105 to AP 125(2). In one specific example, MS 140 provides, to switch 155(1), a proxy notify message including the L2 VNID, the EID set to the MAC address of UE 105, the RLOC set to the RLOC of switch 155(1), and the TLV identifying the IP address of AP 125(2) and the appropriate SGT. At operation 838, based on the notification message, switch 155(1) maps the MAC address of UE 105 to AT1. This causes switch 155(1) to forward downlink packets destined for UE 105 to AP 125(2).

At operations 840 and 842, MS 140 provides publications to switch 155(2) and border node 165, respectively. The publications include the L2 VNID for the MAC address of UE 105 and the RLOC set to the RLOC of switch 155(1). At operation 844, switch 155(1) obtains, from border node 165, downlink packets destined for UE 105. At operation 846, switch 155(1) provides, to AP 125(2), the downlink packets destined for UE 105. At operation 848, AP 125(2) provides the downlink packets to UE 105. At operation 850, CTF 135 determines that the handover release timer has expired. At operation 852, in response to the handover release timer expiring, CTF 135 provides a UE context release command to AP 125(1). At operation 854, CTF 135 obtains a UE context release complete message from AP 125(1).

FIG. 9 illustrates a call flow diagram of an example method 900 of handover preparation utilizing the second mechanism in handover scenario 170(2). At operation 902, AP 125(1) registers with CTF 135. At operation 904, access VXLAN tunnel AT0 is established between AP 125(1) and switch 155(1). At operation 906, AP 125(2) registers with CTF 135. At operation 908, access VXLAN tunnel AT1 is established between AP 125(2) and switch 155(1). At operation 910, AP 125(3) registers with CTF 135. At operation 912, access VXLAN tunnel AT2 is established between AP 125(3) and switch 155(1).

At operation 914, UE 105 enters active mode. At operation 916, AP 125(1) obtains the default bearer for UE 105. At operation 918, switch 155(1) maps the MAC address of UE 105 to AT0. This causes switch 155(1) to forward downlink packets with a destination address set to the MAC address of UE 105, over AT0 to AP 125(1). At operation 920, CTF 135 obtains the default bearer for UE 105. At operation 922, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 924, AP 125(1) obtains an RRC measurement report from UE 105. At operation 926, AP 125(1) determines that a handover needs to be performed, selects the target cell (e.g., selects AP 125(3) as the target AP), and derives KeNB* (in the 4G case). At operation 928, CTF 135 obtains a notification that a handover is to occur for UE 105 from AP 125(1) to AP 125(3). The notification may include, for example, an identification of AP 125(3), the target TAI for AP 125(3) (e.g., identifying tracking area 110), and a Source to Target Transparent Container. At operation 930, CTF 135 provides, to AP 125(3), a handover request including the Source to Target Transparent Container. At operation 932, AP 125(3) generates AS keys from KeNB* and allocates a C-RNTI for UE 105. At operation 934, CTF 135 obtains a handover request acknowledgement from AP 125(3).

At operation 936, CTF 135 identifies the RLOC for the tunnel router associated with AP 125(1) and the RLOC for the tunnel router associated with AP 125(3). Because method 900 involves handover scenario 170(2), the tunnel router associated with AP 125(1) (i.e., switch 155(1)) is different from the tunnel router associated with AP 125(3) (i.e., switch 155(2)). Thus, CTF 135 identifies the RLOCs for switches 155(1) and 155(2). At operation 938, CTF 135 provides a registration message (instead of a GTP Create Indirect Data Forwarding Tunnel Request) to MS 140. The registration message includes a mapping of the EID of UE 105 to the RLOC of switch 155(1) and the RLOC of switch 155(2). Thus, MS 140 has multiple EID-to-RLOC bindings for UE 105. In particular, the EID of UE 105 may be mapped both to the RLOC of switch 155(1) and the RLOC of switch 155(2).

The registration message further includes an indication that the AP 125(3) is a secondary AP. AP 125(1) may be the primary AP by default. Thus, the registration message includes an indication that AP 125(3) is a secondary AP to which switches 155(1) and 155(2) are to provide any downlink packets destined for UE 105 that are obtained from AP 125(1). In one specific example, the registration message may include an L2 VNID, an EID set to the MAC address of UE 105, an RLOC set to the RLOC of switch 155(1), a TLV corresponding to the RLOC of switch 155(1) that identifies the IP address of AP 125(1), an RLOC set to the RLOC of switch 155(2), and a TLV corresponding to the RLOC of switch 155(2) that identifies the IP address of AP 125(3) and provides a flag that the AP 125(3) is a secondary AP.

Based on the registration message, MS 140 causes downlink packets destined for UE 105 to be replicated and provided to both AP 125(1) and AP 125(3). At operation 940, MS 140 provides, to switch 155(1), a notification message including the mapping of the EID of UE 105 to the RLOCs of switches 155(1) and 155(2) and the indication that AP 125(3) is the secondary AP. In one specific example, MS 140 provides, to switch 155(1), a proxy notify message including the L2 VNID, the EID set to the MAC address of UE 105, an RLOC set to the RLOC of switch 155(1), the TLV corresponding to the RLOC of switch 155(1) that identifies the IP address of AP 125(1), an RLOC set to the RLOC of switch 155(2), and a TLV corresponding to the RLOC of switch 155(2) that identifies the IP address of AP 125(3) and provides a flag that the AP 125(3) is a secondary AP.

At operation 942, based on the notification message, switch 155(1) maps the MAC address of UE 105 to AT0 and identifies the RLOC of switch 155(2) as a secondary RLOC. This causes switch 155(1) to provide downlink packets destined for UE 105 to AP 125(1) over AT0, and further causes switch 155(1) to provide any downlink packets obtained from AP 125(1) over AT0 to AP 125(3). Thus, upon receiving a downlink packet that has destination address set to the MAC address of UE 105, switch 155(1) is configured to send that downlink packet to AP 125(1) by default, because AP 125(1) is the primary AP. But if the downlink packet is received from AP 125(1), switch 155(1) is configured to send the downlink packet to switch 155(2), because the RLOC of switch 155(2) is the secondary RLOC.

At operation 944, MS 140 provides, to switch 155(2), a notification message including the mapping of the EID of UE 105 to the RLOC of switch 155(2). In one specific example, MS 140 provides, to switch 155(2), a proxy notify message including the L2 VNID, the EID set to the MAC address of UE 105, an RLOC set to the RLOC of switch 155(2), and a corresponding TLV that identifies the IP address of AP 125(3). At operation 946, based on the notification message, switch 155(2) maps the MAC address of UE 105 to AT2. This causes switch 155(2) to provide downlink packets destined for UE 105 to AP 125(3) over AT2.

At operation 948, MS 140 provides a publication to border node 165. The publication includes the L2 VNID for the MAC address of UE 105 and the RLOC set to the RLOC of switch 155(1). At operation 950, CTF 135 provides a handover command to AP 125(1). At this point, border node 165 is configured to provide downlink packets destined for UE 105 to switch 155(1) over AT0. Switch 155(1) is in turn configured to provide the downlink packets to AP 125(1) by default (e.g., if the downlink packets are obtained from border node 165), and to switch 155(2) if the downlink packets destined for UE 105 are obtained from AP 125(1). Switch 155(2) is configured to provide the downlink packets destined for UE 105 to AP 125(3), which is in turn configured to provide the downlink packets to UE 105.

FIG. 10 illustrates a call flow diagram of an example method 1000 for handover execution utilizing the second mechanism in handover scenario 170(2). Initially, border node 165 may obtain downlink packets from DN 120. The downlink packets may be destined for UE 105 (e.g., the downlink packets may identify the MAC or IP address of UE 105 as the destination addresses of the downlink packets). At operation 1002, border node 165 provides the downlink packets to switch 155(1), and at operation 1004, switch 155(1) provides the downlink packets to AP 125(1).

At operation 1006, AP 125(1) replicates the downlink packets to generate a first copy of the downlink packets and a second copy of the downlink packets, and provides the first copy of the downlink packets to switch 155(1) over AT0. At operation 1008, AP 125(1) provides the second copy of the downlink packets to UE 105. At operation 1010, based on the notification message, switch 155(1) provides (e.g., forwards) the first copy of the downlink packets to switch 155(2) because the RLOC of switch 155(2) is the secondary RLOC. At operation 1012, switch 155(2) provides the first copy of the downlink packets to AP 125(3). At operation 1014, AP 125(3) buffers the second copy of the downlink packets until AP 125(3) obtains a handover confirmation from UE 105.

At operation 1016, AP 125(1) provides an RRC Connection Reconfiguration Request to UE 105. At operation 1018, CTF 135 obtains an AP status transfer from AP 125(1). At operation 1020, AP 125(3) obtains an indication that the RRC connection reconfiguration is complete from UE 105. The indication may include the target C-RNTI. At operation 1022, AP 125(3) obtains the handover confirmation from UE 105, and the handover procedure is complete. At this point, AP 125(3) is configured to forward the buffered downlink packets to UE 105 and obtain uplink packets from UE 105.

At operation 1024, AP 125(3) forwards the buffered downlink packets to UE 105. Thus, UE 105 obtains downlink packets from both AP 125(1) and AP 125(3) during the handover procedure to help ensure that no downlink packets are lost. If UE 105 obtains identical copies of a given downlink packet, UE 105 may simply drop one of the identical copies. At operation 1026, AP 125(3) obtains the uplink packets from UE 105. The uplink packets may be destined for DN 120. At operation 1028, switch 155(2) may obtain the uplink packets from AP 125(3). At operation 1030, switch 155(2) may provide the uplink packets to border node 165, which may in turn provide the uplink packets to DN 120.

At operation 1032, CTF 135 obtains a notification that the handover has occurred from AP 125(3). At operation 1034, CTF 135 starts a handover release timer. At operation 1036, CTF 135 provides a registration message (instead of a modify bearer request) to MS 140. The registration message includes a mapping of the EID of UE 105 to the RLOC of switch 155(2). The registration message further includes an indication that the RLOC of switch 155(2) is associated with AP 125(3). In one specific example, the registration message may include a L2 VNID, an EID set to the MAC address of UE 105, an RLOC set to the RLOC of switch 155(2), and a TLV identifying the IP address of AP 125(3).

At operation 1038, based on the registration message, MS 140 provides, to switch 155(2), a notification message including the mapping of the EID of UE 105 to the RLOC of switch 155(2), and an indication to provide the downlink packets destined for UE 105 to AP 125(3). In one specific example, the notification message may be a proxy notify message including the L2 VNID, the EID set to the MAC address of UE 105, the RLOC set to the RLOC of switch 155(2), and a TLV identifying the IP address of AP 125(3). At operation 1040, switch 155(2) maps the MAC address of UE 105 to AT2. This causes switch 155(2) to forward downlink packets destined for UE 105 to AP 125(3). For example, this may cause switch 155(2) to send any downlink packets having a destination address set to the MAC address of UE 105 to AP 125(3) over AT2.

At operations 1042 and 1044, MS 140 provides, to switch 155(1) and border node 165, respectively, a publication that includes the L2 VNID for the MAC address of UE 105 and the RLOC set to the RLOC of switch 155(2). At operation 1046, border node 165 provides downlink packets destined for UE 105 to switch 155(2). At operation 1048, based on the notification message, switch 155(2) provides, to AP 125(3), the downlink packets destined for UE 105. At operation 1050, AP 125(3) provides the downlink packets to UE 105. At operation 1052, CTF 135 determines that the handover release timer has expired. At operation 1054, in response to the handover release timer expiring, CTF 135 provides a UE context release command to AP 125(1). At operation 1056, CTF 135 obtains a UE context release complete message from AP 125(1).

FIG. 11 illustrates a call flow diagram of an example method 1100 of handover preparation utilizing the third mechanism in handover scenario 170(1). At operation 1102, AP 125(1) registers with CTF 135. At operation 1104, access VXLAN tunnel AT0 is established between AP 125(1) and switch 155(1). At operation 1106, AP 125(2) registers with CTF 135. At operation 1108, access VXLAN tunnel AT1 is established between AP 125(2) and switch 155(1). At operation 1110, AP 125(3) registers with CTF 135. At operation 1112, access VXLAN tunnel AT2 is established between AP 125(3) and switch 155(1).

At operation 1114, UE 105 enters active mode. At operation 1116, AP 125(1) obtains the default bearer for UE 105. At operation 1118, switch 155(1) maps the MAC address of UE 105 to AT0. This causes switch 155(1) to forward downlink packets with a destination address set to the MAC address of UE 105, over AT0 to AP 125(1). At operation 1120, CTF 135 obtains the default bearer for UE 105. At operation 1122, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 1124, AP 125(1) obtains an RRC measurement report from UE 105. At operation 1126, AP 125(1) determines that a handover needs to be performed, selects the target cell (e.g., selects AP 125(2) as the target AP), and derives KeNB* (in the 4G case). At operation 1128, CTF 135 obtains a notification that a handover is to occur for UE 105 from AP 125(1) to AP 125(2). The notification may include, for example, an identification of AP 125(2), the target TAI for AP 125(2) (e.g., identifying tracking area 110), and a Source to Target Transparent Container.

At operation 1130, CTF 135 provides, to AP 125(2), an indication to decapsulate encapsulated downlink packets destined for UE 105. The encapsulated downlink packets destined for UE 105 are encapsulated with an outer header (e.g., a VXLAN header) identifying AP 125(1) as a source of the encapsulated downlink packets and further identifying AP 125(2) as a destination of the encapsulated downlink packets. The indication may comprise a handover request including the Source to Target Transparent Container, and may further include an identification of AP 125(1).

At operation 1132, AP 125(2) generates AS keys from KeNB* and allocates a C-RNTI for UE 105. At operation 1134, CTF 135 obtains a handover request acknowledgement from AP 125(2). At operation 1136, AP 125(2) locally creates a VXLAN tunnel between AP 125(1) and AP 125(2). AP 125(2) is now configured to buffer downlink packets destined for UE 105 obtained from AP 125(1) via the VXLAN tunnel. At operation 1138, CTF 135 may prepare a GTP Create Indirect Data Forwarding Tunnel Request, although this may not be required.

At operation 1140, CTF 135 provides, to AP 125(1), an indication to replicate downlink packets destined UE 105 to generate a first copy of the downlink packets and a second copy of the downlink packets, and encapsulate the first copy of the downlink packets with the outer header to generate the encapsulated downlink packets. The indication may comprise a handover command. At 1142, AP 125(1) locally creates the VXLAN tunnel between AP 125(1) and AP 125(2). AP 125(1) is now configured to provide downlink packets destined for UE 105 to AP 125(2) via the VXLAN tunnel. Thus, the VXLAN tunnel between AP 125(1) and AP 125(2) is now established.

Figure 12:
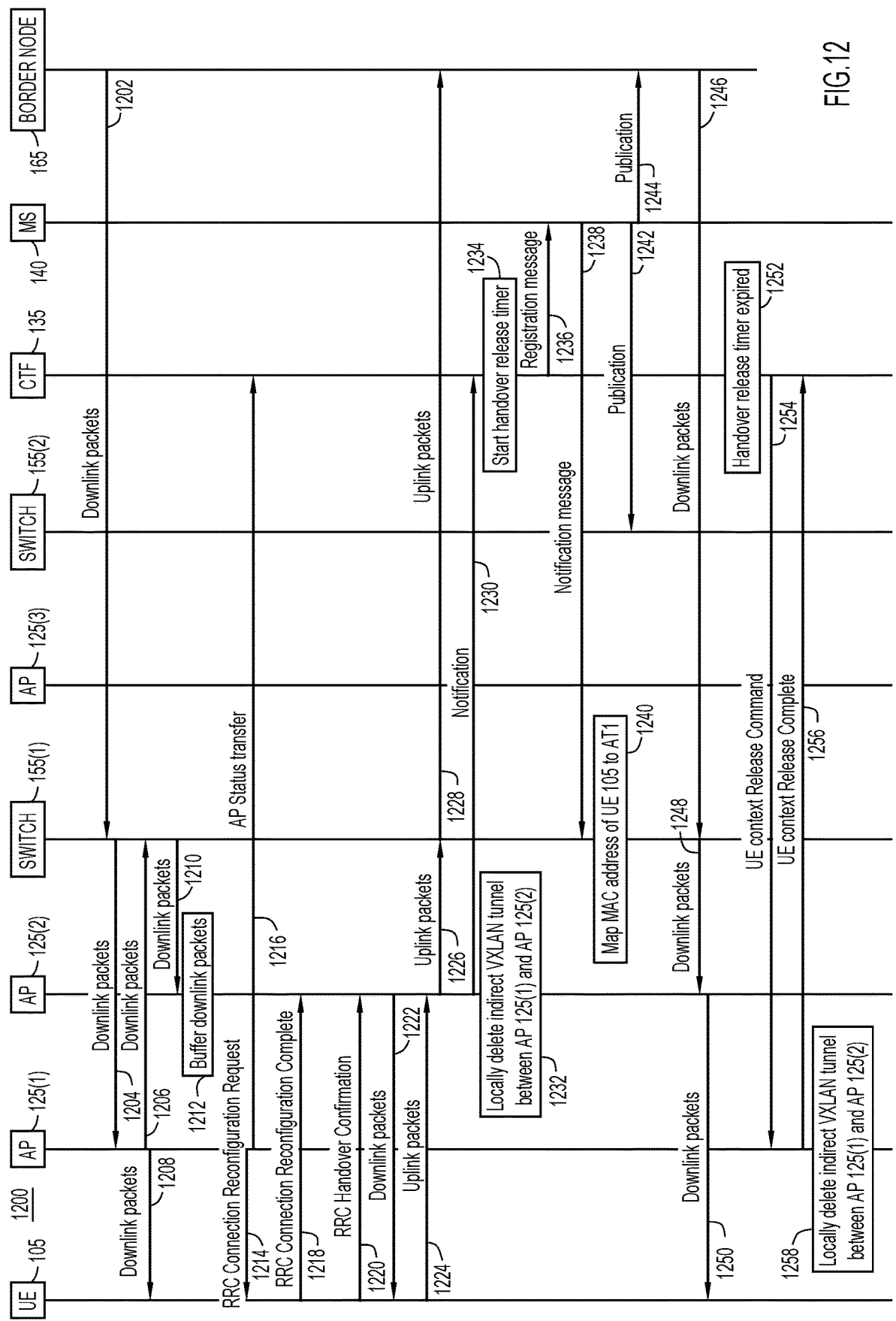
FIG. 12 illustrates a call flow diagram of a method for replicating downlink packets on a source AP using packet encapsulation in an S1AP handover scenario in which the source AP and a target AP are associated with a single tunnel router, according to an example embodiment.

FIG. 12 illustrates a call flow diagram of an example method 1200 of handover execution utilizing the third mechanism in handover scenario 170(1). Initially, border node 165 may obtain downlink packets from DN 120. The downlink packets may be destined for UE 105 (e.g., the downlink packets may identify the MAC or IP address of UE 105 as the destination addresses of the downlink packets). At operation 1202, border node 165 provides the downlink packets to switch 155(1). At operation 1204, switch 155(1) provides the downlink packets destined for UE 105 to AP 125(1).

At operation 1206, AP 125(1) replicates the downlink packets destined for UE 105 to generate the first copy of the downlink packets and the second copy of the downlink packets, encapsulates the first copy of the downlink packets with the outer header to generate the encapsulated downlink packets, and provides the encapsulated downlink packets to switch 155(1). AP 125(1) may provide the encapsulated downlink packets to switch 155(1) over the VXLAN tunnel. At operation 1208, AP 125(1) provides the second copy of the downlink packets to UE 105.

Because method 1200 involves handover scenario 170(1), the tunnel router associated with AP 125(1) and the tunnel router associated with AP 125(2) are a single tunnel router, i.e., switch 155(1). Accordingly, at operation 1210, switch 155(1) identifies AP 125(2) as the destination of the encapsulated downlink packets based on the outer header, which identifies AP 125(1) as the source of the encapsulated downlink packets and AP 125(2) as the destination of the encapsulated downlink packet. Switch 155(1) further provides (e.g., forwards) the encapsulated downlink packets to AP 125(1). At operation 1212, AP 125(2) decapsulates the encapsulated downlink packets and buffers the first copy of the downlink packets until AP 125(2) obtains a handover confirmation from UE 105. AP 125(2) may decapsulate the encapsulated downlink packets in response to determining that the outer header identifies AP 125(1) as the source of the encapsulated downlink packets, and based further on a previously obtained identification of AP 125(1) as the source AP from which UE 105 is transitioning (e.g., at operation 1130).

At operation 1214, AP 125(1) provides an RRC Connection Reconfiguration Request to UE 105. At operation 1216, CTF 135 obtains an AP status transfer from AP 125(1). At operation 1218, AP 125(2) obtains an indication that the RRC connection reconfiguration is complete. The indication may include the target C-RNTI. At operation 1220, AP 125(2) obtains the handover confirmation from UE 105, and the handover procedure is complete. At this point, AP 125(2) is configured to forward the buffered downlink packets to UE 105 and obtain uplink packets from UE 105.

At operation 1222, AP 125(2) provides the buffered downlink packets to UE 105. Thus, UE 105 obtains downlink packets from both AP 125(1) and AP 125(2) during the handover procedure to help ensure that no downlink packets are lost. If UE 105 obtains identical copies of a given downlink packet, UE 105 may simply drop one of the identical copies. At operation 1224, AP 125(2) obtains the uplink packets from UE 105. The uplink packets may be destined for DN 120. At operation 1226, switch 155(1) may obtain the uplink packets from AP 125(2). At operation 1228, switch 155(1) may provide the uplink packets to border node 165, which may in turn provide the uplink packets to DN 120.

At operation 1230, CTF 135 obtains a notification that the handover has occurred from AP 125(2) and that AP 125(2) has stopped or will stop decapsulating encapsulated downlink packets destined for UE 105. At operation 1232, AP 125(2) locally deletes the VXLAN tunnel between AP 125(1) and AP 125(2). At operation 1234, CTF 135 starts a handover release timer. At operation 1236, CTF 135 provides a registration message (instead of a modify bearer request) to MS 140. The registration message includes a mapping of the EID of UE 105 to the RLOC of switch 155(1). The registration message further includes an indication that the RLOC of switch 155(1) is associated with AP 125(2). In one specific example, the registration message may include a L2 VNID, an EID set to the MAC address of UE 105, an RLOC set to the RLOC of switch 155(1), and a TLV identifying the IP address of AP 125(2) and the appropriate SGT.

At operation 1238, based on the registration message, MS 140 provides, to switch 155(1), a notification message including the mapping of the EID of UE 105 to the RLOC of switch 155(1) and an indication for switch 155(1) to provide downlink packets destined for UE 105 to AP 125(2). In one specific example, MS 140 provides, to switch 155(1), a proxy notify message including the L2 VNID, the EID set to the MAC address of UE 105, the RLOC set to the RLOC of switch 155(1), and the TLV identifying the IP address of AP 125(2) and the appropriate SGT. At operation 1240, based on the notification message, switch 155(1) maps the MAC address of UE 105 to AT1. This causes switch 155(1) to forward downlink packets destined for UE 105 to AP 125(2).

At operations 1242 and 1244, MS 140 provides publications to switch 155(2) and border node 165, respectively. The publications include the L2 VNID for the MAC address of UE 105 and the RLOC set to the RLOC of switch 155(1). At operation 1246, switch 155(1) obtains, from border node 165, downlink packets destined for UE 105. At operation 1248, switch 155(1) provides, to AP 125(2), the downlink packets destined for UE 105. At operation 1250, AP 125(2) provides the downlink packets to UE 105. At operation 1252, CTF 135 determines that the handover release timer has expired.

At operation 1254, in response to the handover release timer expiring, CTF 135 provides, to AP 125(1), an indication to stop replicating the downlink packets destined UE 105 and encapsulating the downlink packets with the outer header to generate the encapsulated downlink packets. The indication may comprise a UE context release command. At operation 1256, CTF 135 obtains a UE context release complete message from AP 125(1). At operation 1258, AP 125(1) locally deletes the VXLAN tunnel between AP 125(1) and AP 125(2). Thus, the VXLAN tunnel between AP 125(1) and AP 125(2) is now removed, and AP 125(1) stops replicating the downlink packets destined UE 105 and encapsulating the downlink packets with the outer header to generate the encapsulated downlink packets.

Figure 13:
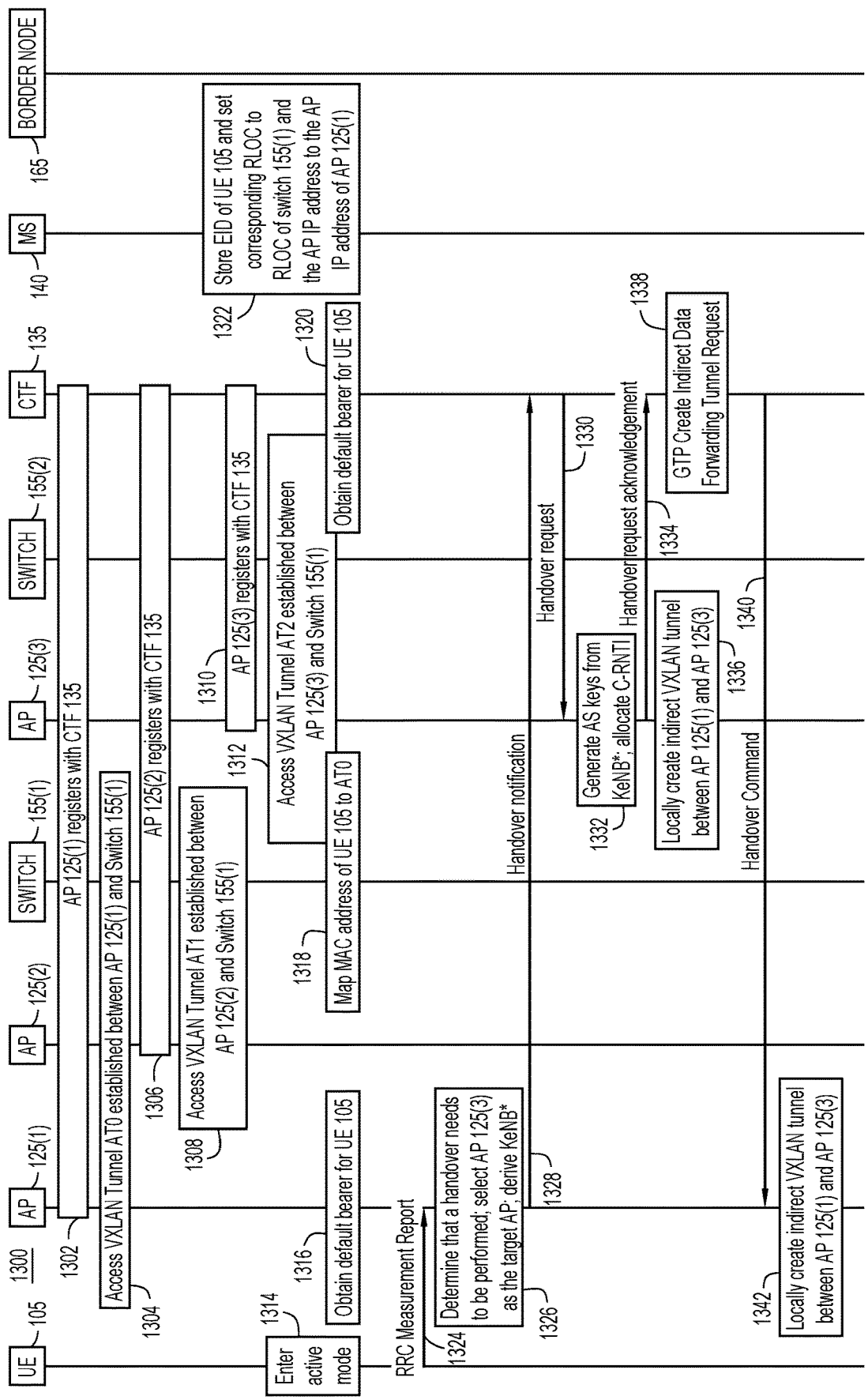
FIG. 13 illustrates a call flow diagram of a method of preparing for replication of downlink packets on a source AP using packet encapsulation in an S1AP handover scenario in which the source AP and a target AP are associated with respective tunnel routers, according to an example embodiment.

FIG. 13 illustrates a call flow diagram of an example method 1300 of handover preparation utilizing the third mechanism in handover scenario 170(2). At operation 1302, AP 125(1) registers with CTF 135. At operation 1304, access VXLAN tunnel AT0 is established between AP 125(1) and switch 155(1). At operation 1306, AP 125(2) registers with CTF 135. At operation 1308, access VXLAN tunnel AT1 is established between AP 125(2) and switch 155(1). At operation 1310, AP 125(3) registers with CTF 135. At operation 1312, access VXLAN tunnel AT2 is established between AP 125(3) and switch 155(1).

At operation 1314, UE 105 enters active mode. At operation 1316, AP 125(1) obtains the default bearer for UE 105. At operation 1318, switch 155(1) maps the MAC address of UE 105 to AT0. This causes switch 155(1) to forward downlink packets with a destination address set to the MAC address of UE 105, over AT0 to AP 125(1). At operation 1320, CTF 135 obtains the default bearer for UE 105. At operation 1322, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 1324, AP 125(1) obtains an RRC measurement report from UE 105. At operation 1326, AP 125(1) determines that a handover needs to be performed, selects the target cell (e.g., selects AP 125(3) as the target AP), and derives KeNB* (in the 4G case). At operation 1328, CTF 135 obtains a notification that a handover is to occur for UE 105 from AP 125(1) to AP 125(3). The notification may include, for example, an identification of AP 125(3), the target TAI for AP 125(3) (e.g., identifying tracking area 110), and a Source to Target Transparent Container.

At operation 1330, CTF 135 provides, to AP 125(3), an indication to decapsulate encapsulated downlink packets destined for UE 105. The encapsulated downlink packets destined for UE 105 are encapsulated with an outer header (e.g., a VXLAN header) identifying AP 125(1) as a source of the encapsulated downlink packets and further identifying AP 125(3) as a destination of the encapsulated downlink packets. The indication may comprise a handover request including the Source to Target Transparent Container, and may further include an identification of AP 125(1).

At operation 1332, AP 125(3) generates AS keys from KeNB* and allocates a C-RNTI for UE 105. At operation 1334, CTF 135 obtains a handover request acknowledgement from AP 125(3). At operation 1336, AP 125(3) locally creates a VXLAN tunnel between AP 125(1) and AP 125(3). AP 125(3) is now configured to buffer downlink packets destined for UE 105 obtained from AP 125(1) via the VXLAN tunnel. At operation 1338, CTF 135 may prepare a GTP Create Indirect Data Forwarding Tunnel Request, although this may not be required.

At operation 1340, CTF 135 provides, to AP 125(1), an indication to replicate downlink packets destined UE 105 to generate a first copy of the downlink packets and a second copy of the downlink packets, and encapsulate the first copy of the downlink packets with the outer header to generate the encapsulated downlink packets. The indication may comprise a handover command. At 1342, AP 125(1) locally creates the VXLAN tunnel between AP 125(1) and AP 125(3). AP 125(1) is now configured to provide downlink packets destined for UE 105 to AP 125(3) via the VXLAN tunnel. Thus, the VXLAN tunnel between AP 125(1) and AP 125(3) is now established.

Figure 14:
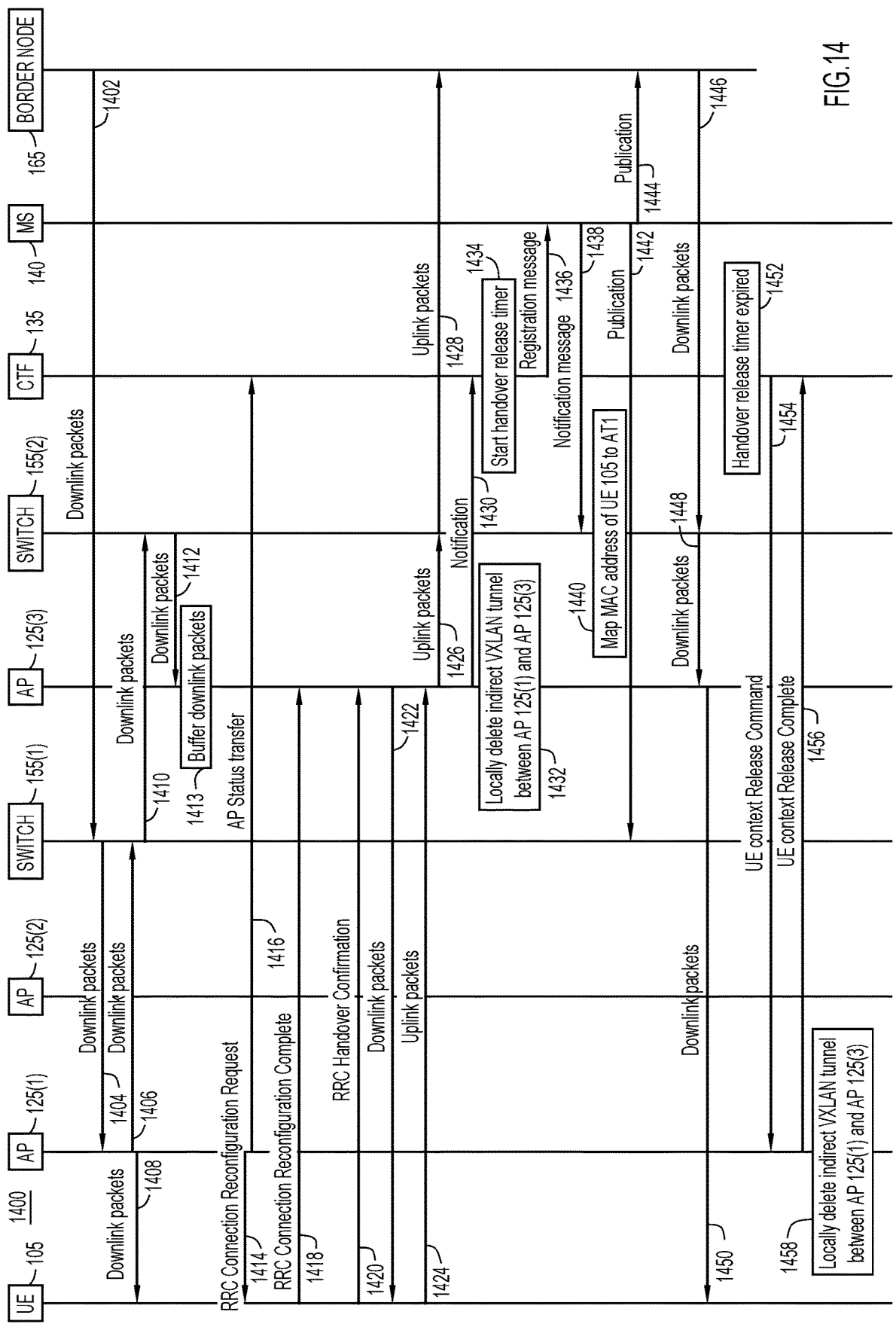
FIG. 14 illustrates a call flow diagram of a method for replicating downlink packets on a source AP using packet encapsulation in an S1AP handover scenario in which the source AP and a target AP are associated with respective tunnel routers, according to an example embodiment.

FIG. 14 illustrates a call flow diagram of an example method 1400 of handover execution utilizing the third mechanism in handover scenario 170(2). Initially, border node 165 may obtain downlink packets from DN 120. The downlink packets may be destined for UE 105 (e.g., the downlink packets may identify the MAC or IP address of UE 105 as the destination addresses of the downlink packets). At operation 1402, border node 165 provides the downlink packets to switch 155(1). At operation 1404, switch 155(1) provides the downlink packets destined for UE 105 to AP 125(1).

At operation 1406, AP 125(1) replicates the downlink packets destined for UE 105 to generate the first copy of the downlink packets and the second copy of the downlink packets, encapsulates the first copy of the downlink packets with the outer header to generate the encapsulated downlink packets, and provides the encapsulated downlink packets to switch 155(1). AP 125(1) may provide the encapsulated downlink packets to switch 155(1) over the VXLAN tunnel. At operation 1408, AP 125(1) provides the second copy of the downlink packets to UE 105.

Because method 1400 involves handover scenario 170(2), the tunnel router associated with AP 125(1) (i.e., switch 155(1) is different from the tunnel router associated with AP 125(3) (i.e., switch 155(2))). Accordingly, at operation 1410, switch 155(1) identifies AP 125(3) as the destination of the encapsulated downlink packets based on the outer header, which identifies AP 125(1) as the source of the encapsulated downlink packets and AP 125(3) as the destination of the encapsulated downlink packet. Switch 155(1) further provides the encapsulated downlink packets to switch 155(2). At operation 1412, switch 155(2) identifies AP 125(3) as the destination of the encapsulated downlink packets based on the outer header and provides the encapsulated downlink packets to AP 125(3). AP 125(3) decapsulates the encapsulated downlink packets and, at operation 1413, buffers the first copy of the downlink packets until AP 125(3) obtains a handover confirmation from UE 105. AP 125(3) may decapsulate the encapsulated downlink packets in response to determining that the outer header identifies AP 125(1) as the source of the encapsulated downlink packets, and based further on a previously obtained identification of AP 125(1) as the source AP from which UE 105 is transitioning (e.g., at operation 1330).

At operation 1414, AP 125(1) provides an RRC Connection Reconfiguration Request to UE 105. At operation 1416, CTF 135 obtains an AP status transfer from AP 125(1). At operation 1418, AP 125(3) obtains, from UE 105, an indication that the RRC connection reconfiguration is complete. The indication may include the target C-RNTI. At operation 1420, AP 125(3) obtains the handover confirmation from UE 105, and the handover procedure is complete. At this point, AP 125(3) is configured to forward the buffered downlink packets to UE 105 and obtain uplink packets from UE 105.

At operation 1422, AP 125(3) provides the buffered downlink packets to UE 105. Thus, UE 105 obtains downlink packets from both AP 125(1) and AP 125(3) during the handover procedure to help ensure that no downlink packets are lost. If UE 105 obtains identical copies of a given downlink packet, UE 105 may simply drop one of the identical copies. At operation 1424, AP 125(3) obtains uplink packets from UE 105. The uplink packets may be destined for DN 120. At operation 1426, switch 155(2) may obtain the uplink packets from AP 125(3). At operation 1428, switch 155(2) may provide the uplink packets to border node 165, which may in turn provide the uplink packets to DN 120.

At operation 1430, CTF 135 obtains a notification that the handover has occurred from AP 125(3) and that AP 125(3) has stopped or will stop decapsulating encapsulated downlink packets destined for UE 105. At operation 1432, AP 125(3) locally deletes the VXLAN tunnel between AP 125(1) and AP 125(3). At operation 1434, CTF 135 starts a handover release timer. At operation 1436, CTF 135 provides a registration message (instead of a modify bearer request) to MS 140. The registration message includes a mapping of the EID of UE 105 to the RLOC of switch 155(2). The registration message further includes an indication that the RLOC of switch 155(2) is associated with AP 125(3). In one specific example, the registration message may include a L2 VNID, an EID set to the MAC address of UE 105, an RLOC set to the RLOC of switch 155(2), and a TLV identifying the IP address of AP 125(3) and the appropriate SGT.

At operation 1438, based on the registration message, MS 140 provides, to switch 155(2), a notification message including the mapping of the EID of UE 105 to the RLOC of switch 155(2) and an indication for switch 155(2) to provide downlink packets destined for UE 105 to AP 125(3). In one specific example, MS 140 provides, to switch 155(2), a proxy notify message including the L2 VNID, the EID set to the MAC address of UE 105, the RLOC set to the RLOC of switch 155(2), and the TLV identifying the IP address of AP 125(3) and the appropriate SGT. At operation 1440, based on the notification message, switch 155(2) maps the MAC address of UE 105 to AT2. This causes switch 155(2) to forward downlink packets destined for UE 105 to AP 125(3).

At operations 1442 and 1444, MS 140 provides publications to switch 155(1) and border node 165, respectively. The publications include the L2 VNID for the MAC address of UE 105 and the RLOC set to the RLOC of switch 155(2). At operation 1446, switch 155(2) obtains, from border node 165, downlink packets destined for UE 105. At operation 1448, based on the notification message, switch 155(2) provides, to AP 125(3), the downlink packets destined for UE 105. At operation 1450, AP 125(3) provides the downlink packets to UE 105. At operation 1452, CTF 135 determines that the handover release timer has expired.

At operation 1454, in response to the handover release timer expiring, CTF 135 provides, to AP 125(1), an indication to stop replicating the downlink packets destined UE 105 and encapsulating the downlink packets with the outer header to generate the encapsulated downlink packets. The indication may comprise a UE context release command. At operation 1456, CTF 135 obtains a UE context release complete message from AP 125(1). At operation 1458, AP 125(1) locally deletes the VXLAN tunnel between AP 125(1) and AP 125(3). Thus, the VXLAN tunnel between AP 125(1) and AP 125(3) is now removed, and AP 125(1) stops replicating the downlink packets destined UE 105 and encapsulating the downlink packets with the outer header to generate the encapsulated downlink packets.

Unlike FIGS. 2-14, which relate to downlink packet replication to support an S1AP handover, FIGS. 15A, 15B, 16A, and 16B relate to downlink packet replication to support an X2 handover. In particular, and with continued reference to FIG. 1, FIGS. 15A and 15B relate to handover scenario 170(1), and FIGS. 16A and 16B relate to handover scenario 170(2).

Figure 15A:
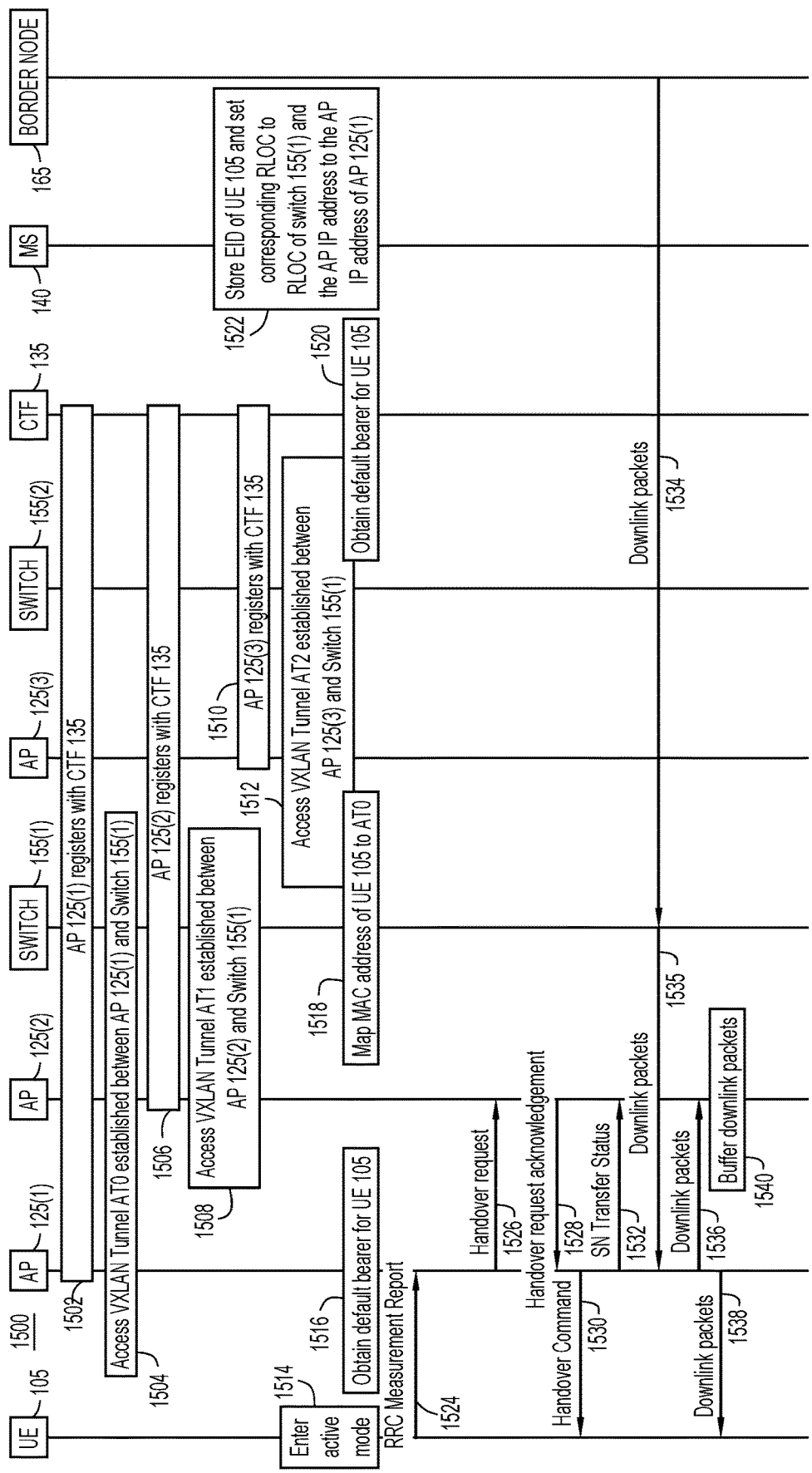
FIGS. 15A and 15B collectively illustrate a call flow diagram of a method for replicating downlink packets on a source AP in an X2 handover scenario in which the source AP and a target AP are associated with a single tunnel router, according to an example embodiment.
Figure 15B:
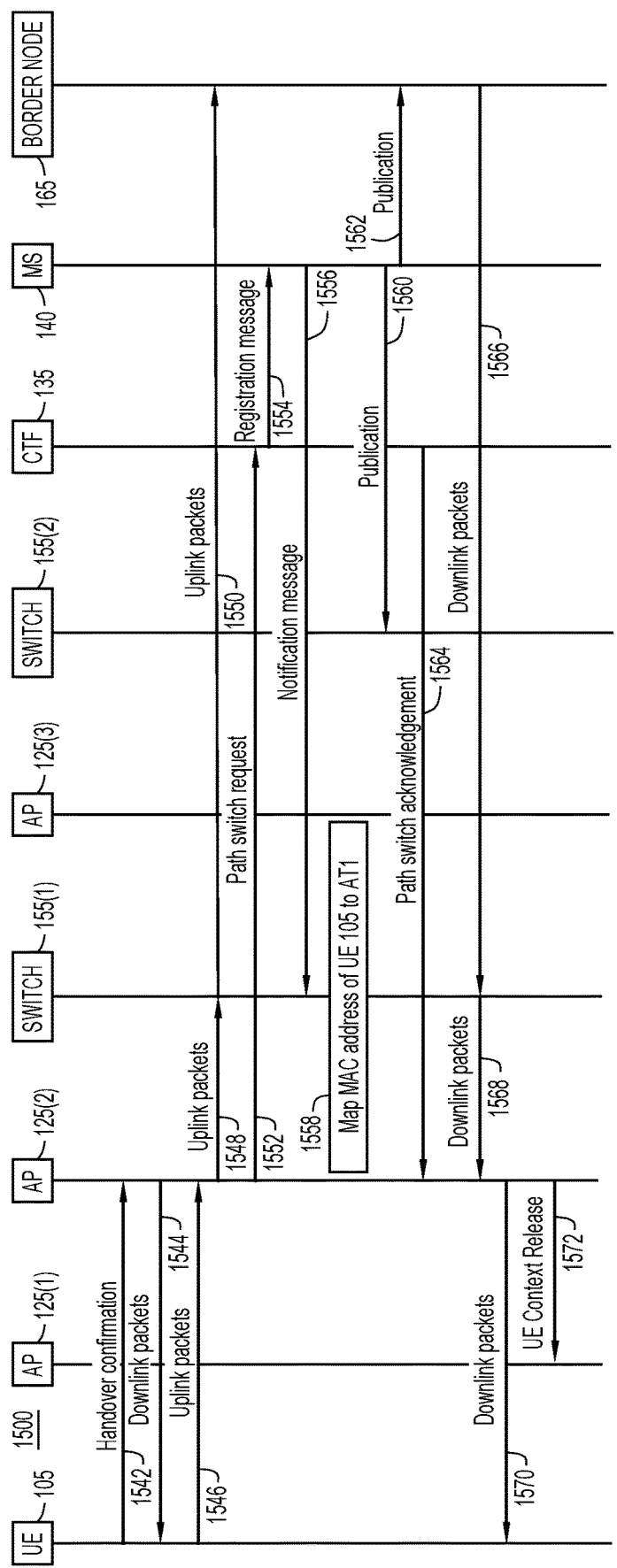

Turning first to FIGS. 15A and 15B, shown is a call flow diagram of an example method 1500 for replicating downlink packets on a source AP in handover scenario 170(1). At operation 1502, AP 125(1) registers with CTF 135. At operation 1504, access VXLAN tunnel AT0 is established between AP 125(1) and switch 155(1). At operation 1506, AP 125(2) registers with CTF 135. At operation 1508, access VXLAN tunnel AT1 is established between AP 125(2) and switch 155(1). At operation 1510, AP 125(3) registers with CTF 135. At operation 1512, access VXLAN tunnel AT2 is established between AP 125(3) and switch 155(1).

At operation 1514, UE 105 enters active mode. At operation 1516, AP 125(1) obtains the default bearer for UE 105. At operation 1518, switch 155(1) maps the MAC address of UE 105 to AT0. This causes switch 155(1) to forward downlink packets with a destination address set to the MAC address of UE 105, over AT0 to AP 125(1). At operation 1520, CTF 135 obtains the default bearer for UE 105. At operation 1522, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 1524, AP 125(1) obtains an RRC measurement report from UE 105. At operation 1526, AP 125(1) provides a handover request to AP 125(2). At operation 1528, AP 125(2) provides a handover request acknowledgment to AP 125(1). At operation 1530, AP 125(1) provides a handover command to UE 105. At operation 1532, AP 125(1) provides a Sequence Number (SN) transfer status to AP 125(2). At operation 1534, switch 155(1) obtains downlink packets destined for UE 105 from border node 165. Border node 165 may have obtained the downlink packets from DN 120. The downlink packets may, for example, identify the MAC or IP address of UE 105 as the destination addresses of the downlink packets. At operation 1535, AP 125(1) obtains the downlink packets from switch 155(1). At operation 1536, AP 125(1) replicates the downlink packets to generate a first copy of the downlink packets and a second copy of the downlink packets and provides the first copy of the downlink packets to AP 125(2). At operation 1538, AP 125(1) provides the second copy of the downlink packets to UE 105. At operation 1540, AP 125(2) buffers the first copy of the downlink packets until AP 125(2) obtains a handover confirmation from UE 105.

At operation 1542, AP 125(2) obtains the handover confirmation from UE 105, and a data plane is thereby established between UE 105 and AP 125(2). At operation 1544, AP 125(2) provides the first copy of the downlink packets to UE 105. Thus, UE 105 obtains downlink packets from both AP 125(1) and AP 125(2) during the handover procedure to help ensure that no downlink packets are lost. If UE 105 obtains identical copies of a given downlink packet, UE 105 may simply drop one of the identical copies. At operation 1546, AP 125(2) obtains uplink packets from UE 105. The uplink packets may be destined for DN 120. At operation 1548, switch 155(1) may obtain the uplink packets from AP 125(2). At operation 1550, switch 155(1) may provide the uplink packets to border node 165, which may in turn provide the uplink packets to DN 120.

At operation 1552, CTF 135 may obtain, from AP 125(2), a path switch request including the IP address of UE 105 and the corresponding Tunnel Endpoint ID (TED). At operation 1554, CTF 135 provides a registration message (instead of a modify bearer request) to MS 140. The registration message includes a mapping of the EID of UE 105 to the RLOC of switch 155(1). The registration message further includes an indication that the RLOC of switch 155(1) is associated with AP 125(2). In one specific example, the registration message may include a L2 VNID, an EID set to the MAC address of UE 105, an RLOC set to the RLOC of switch 155(1), and a TLV identifying the IP address of AP 125(2).

At operation 1556, based on the registration message, MS 140 provides, to switch 155(1), a notification message including the mapping of the EID of UE 105 to the RLOC of switch 155(1) and an indication for switch 155(1) to provide downlink packets destined for UE 105 to AP 125(2). In one specific example, MS 140 provides, to switch 155(1), a proxy notify message including the L2 VNID, the EID set to the MAC address of UE 105, the RLOC set to the RLOC of switch 155(1), and the TLV identifying the IP address of AP 125(2). At operation 1558, based on the notification message, switch 155(1) maps the MAC address of UE 105 to AT1. This causes switch 155(1) to forward downlink packets destined for UE 105 to AP 125(2).

At operations 1560 and 1562, MS 140 provides publications to switch 155(2) and border node 165, respectively. The publications include the L2 VNID for the MAC address of UE 105 and the RLOC set to the RLOC of switch 155(1). At operation 1564, CTF 135 provides, to AP 125(2), a path switch acknowledgment including the IP address of UE 105 and the corresponding TEID. At operation 1566, switch 155(1) obtains, from border node 165, downlink packets destined for UE 105. At operation 1568, switch 155(1) provides, to AP 125(2), the downlink packets destined for UE 105. At operation 1570, AP 125(2) provides the downlink packets to UE 105. At operation 1572, AP 125(2) provides a UE context release to AP 125(1).

Figure 16A:
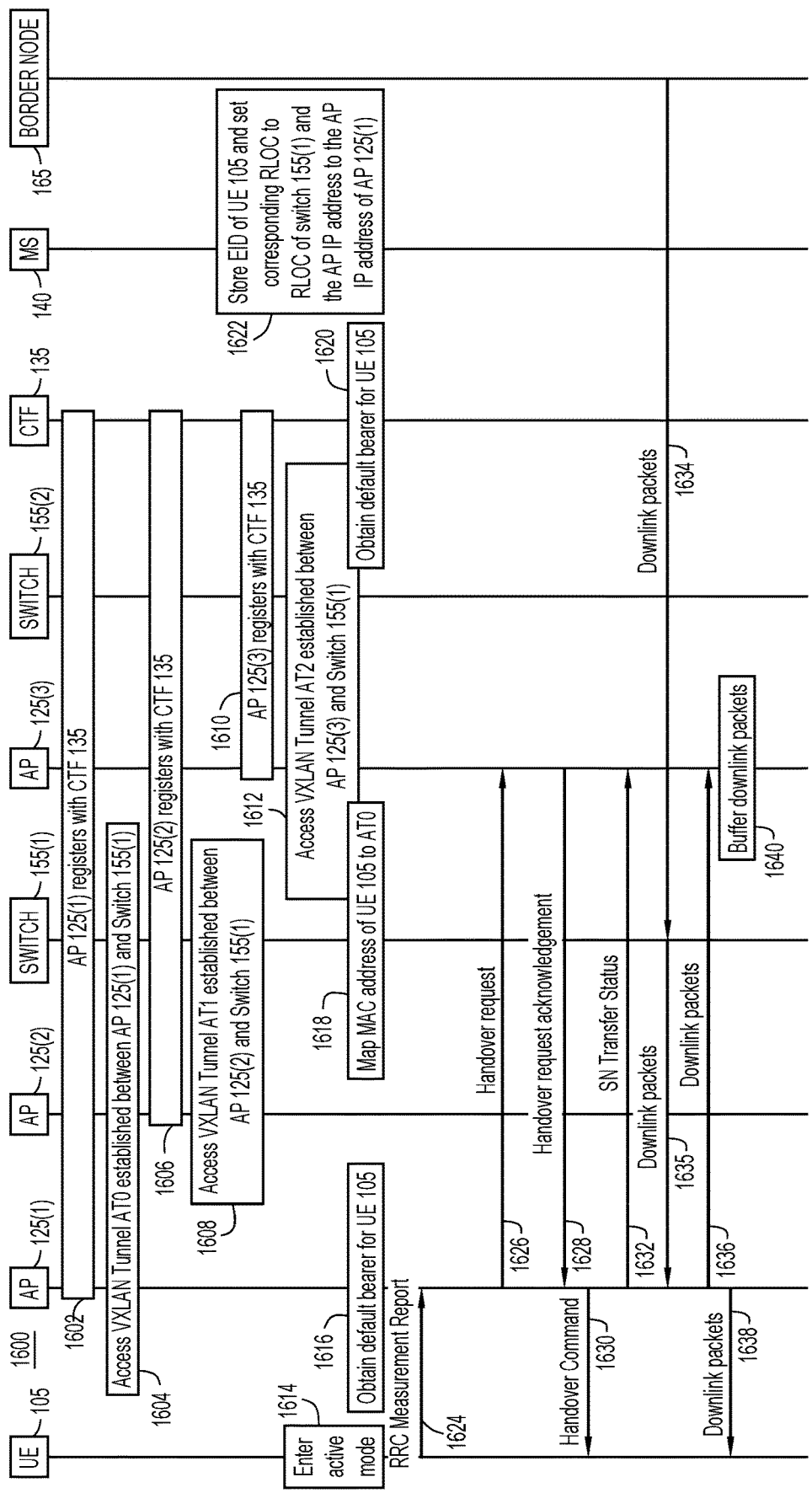
FIGS. 16A and 16B illustrates a call flow diagram of a method for replicating downlink packets on a source access point in an X2 handover scenario in which the source AP and a target AP are associated with respective tunnel routers, according to an example embodiment.
Figure 16B:
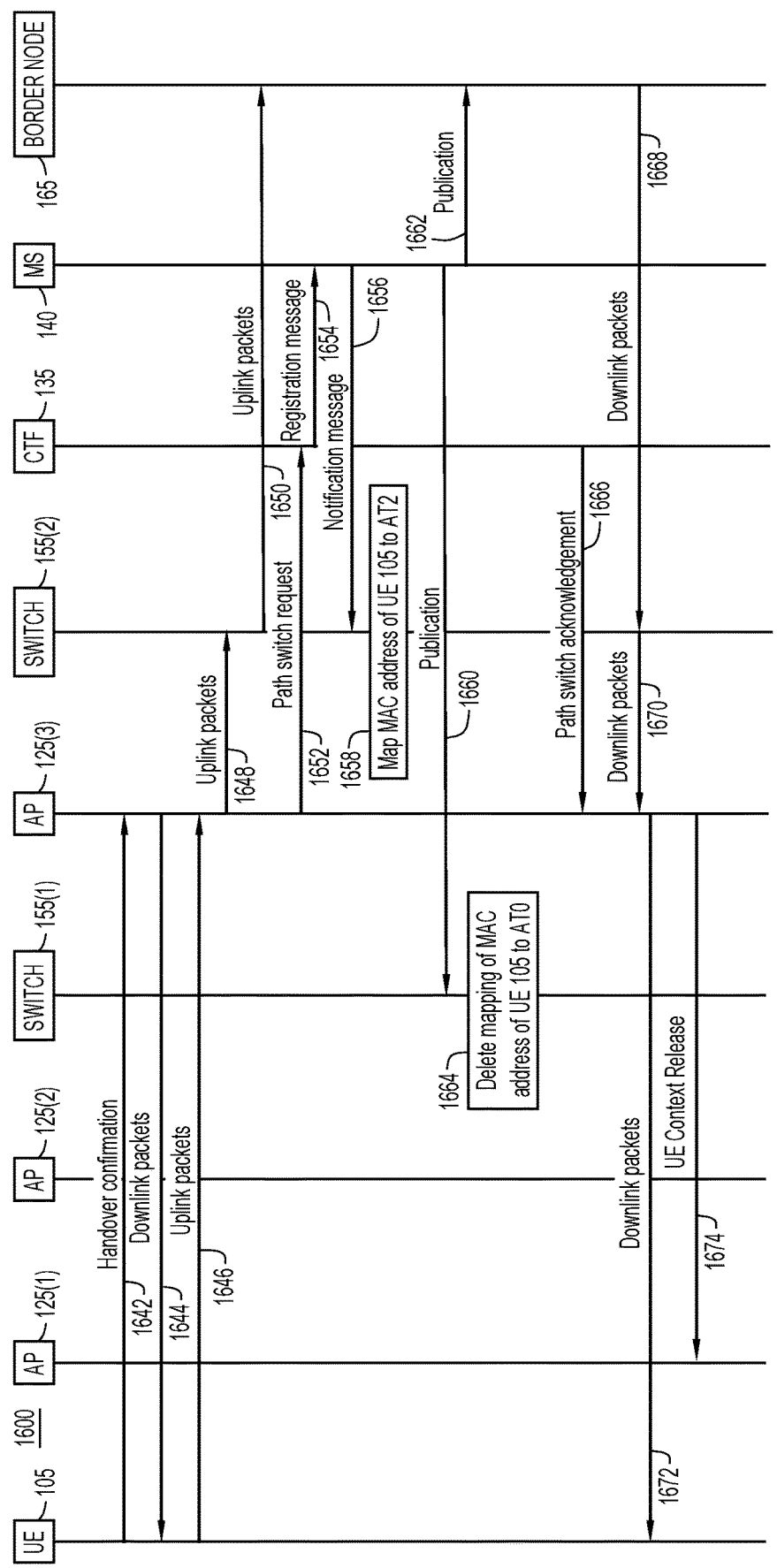

FIGS. 16A and 16B collectively illustrate a call flow diagram of an example method 1600 for replicating downlink packets on a source AP in handover scenario 170(2). At operation 1602, AP 125(1) registers with CTF 135. At operation 1604, access VXLAN tunnel AT0 is established between AP 125(1) and switch 155(1). At operation 1606, AP 125(2) registers with CTF 135. At operation 1608, access VXLAN tunnel AT1 is established between AP 125(2) and switch 155(1). At operation 1610, AP 125(3) registers with CTF 135. At operation 1612, access VXLAN tunnel AT2 is established between AP 125(3) and switch 155(1).

At operation 1614, UE 105 enters active mode. At operation 1616, AP 125(1) obtains the default bearer for UE 105. At operation 1618, switch 155(1) maps the MAC address of UE 105 to AT0. This causes switch 155(1) to forward downlink packets with a destination address set to the MAC address of UE 105, over AT0 to AP 125(1). At operation 1620, CTF 135 obtains the default bearer for UE 105. At operation 1622, MS 140 stores the EID of UE 105 (e.g., the MAC address of UE 105, the IP address of UE 105, etc.) and sets the corresponding RLOC to the RLOC of switch 155(1) and the corresponding AP IP address to the IP address of AP 125(1). For example, MS 140 may provide, to switches 155(1) and 155(2) and border node 165, a notification message including a mapping of the EID of UE 105 to the RLOC of switch 155(1) and a TLV indicating that the corresponding AP IP address is the IP address of AP 125(1). Thus, initially, border node 165 is configured to provide downlink packets destined for UE 105 to switch 155(1), which is configured to provide the downlink packets to AP 125(1), which is in turn configured to provide the downlink packets to UE 105.

At operation 1624, AP 125(1) obtains an RRC measurement report from UE 105. At operation 1626, AP 125(1) provides a handover request to AP 125(3). At operation 1628, AP 125(3) provides a handover request acknowledgment to AP 125(1). At operation 1630, AP 125(1) provides a handover command to UE 105. At operation 1632, AP 125(1) provides an SN transfer status to AP 125(3). At operation 1634, switch 155(1) obtains downlink packets destined for UE 105 from border node 165. Border node 165 may have obtained the downlink packets from DN 120. The downlink packets may, for example, identify the MAC or IP address of UE 105 as the destination addresses of the downlink packets. At operation 1635, AP 125(1) obtains the downlink packets from switch 155(1). At operation 1636, AP 125(1) replicates the downlink packets to generate a first copy of the downlink packets and a second copy of the downlink packets and provides the first copy of the downlink packets to AP 125(3). At operation 1638, AP 125(1) provides the second copy of the downlink packets to UE 105. At operation 1640, AP 125(3) buffers the first copy of the downlink packets until AP 125(3) obtains a handover confirmation from UE 105.

At operation 1642, AP 125(3) obtains the handover confirmation from UE 105, and a data plane is thereby established between UE 105 and AP 125(3). At operation 1644, AP 125(3) provides the first copy of the downlink packets to UE 105. Thus, UE 105 obtains downlink packets from both AP 125(1) and AP 125(3) during the handover procedure to help ensure that no downlink packets are lost. If UE 105 obtains identical copies of a given downlink packet, UE 105 may simply drop one of the identical copies. At operation 1646, AP 125(3) obtains uplink packets from UE 105. The uplink packets may be destined for DN 120. At operation 1648, switch 155(2) may obtain the uplink packets from AP 125(3). At operation 1650, switch 155(2) may provide the uplink packets to border node 165, which may in turn provide the uplink packets to DN 120.

At operation 1652, CTF 135 may obtain, from AP 125(3), a path switch request including the IP address of UE 105 and the corresponding TEID. At operation 1654, CTF 135 provides a registration message (instead of a modify bearer request) to MS 140. The registration message includes a mapping of the EID of UE 105 to the RLOC of switch 155(2). The registration message further includes an indication that the RLOC of switch 155(2) is associated with AP 125(3). In one specific example, the registration message may include a L2 VNID, an EID set to the MAC address of UE 105, an RLOC set to the RLOC of switch 155(2), and a TLV identifying the IP address of AP 125(3).

At operation 1656, based on the registration message, MS 140 provides, to switch 155(2), a notification message including the mapping of the EID of UE 105 to the RLOC of switch 155(2) and an indication for switch 155(2) to provide downlink packets destined for UE 105 to AP 125(3). In one specific example, MS 140 provides, to switch 155(2), a proxy notify message including the L2 VNID, the EID set to the MAC address of UE 105, the RLOC set to the RLOC of switch 155(2), and the TLV identifying the IP address of AP 125(3). At operation 1658, based on the notification message, switch 155(2) maps the MAC address of UE 105 to AT2. This causes switch 155(2) to forward downlink packets destined for UE 105 to AP 125(3).

At operations 1660 and 1662, MS 140 provides publications to switch 155(1) and border node 165, respectively. The publications include the L2 VNID for the MAC address of UE 105 and the RLOC set to the RLOC of switch 155(2). At operation 1664, switch 155(1) deletes the mapping of the MAC address of UE 105 to AT0. At operation 1666, CTF 135 provides, to AP 125(3), a path switch acknowledgment including the IP address of UE 105 and the corresponding TEID. At operation 1668, switch 155(2) obtains, from border node 165, downlink packets destined for UE 105. At operation 1670, switch 155(2) provides, to AP 125(3), the downlink packets destined for UE 105. At operation 1672, AP 125(3) provides the downlink packets to UE 105. At operation 1674, AP 125(3) provides a UE context release to AP 125(1).

Figure 17:
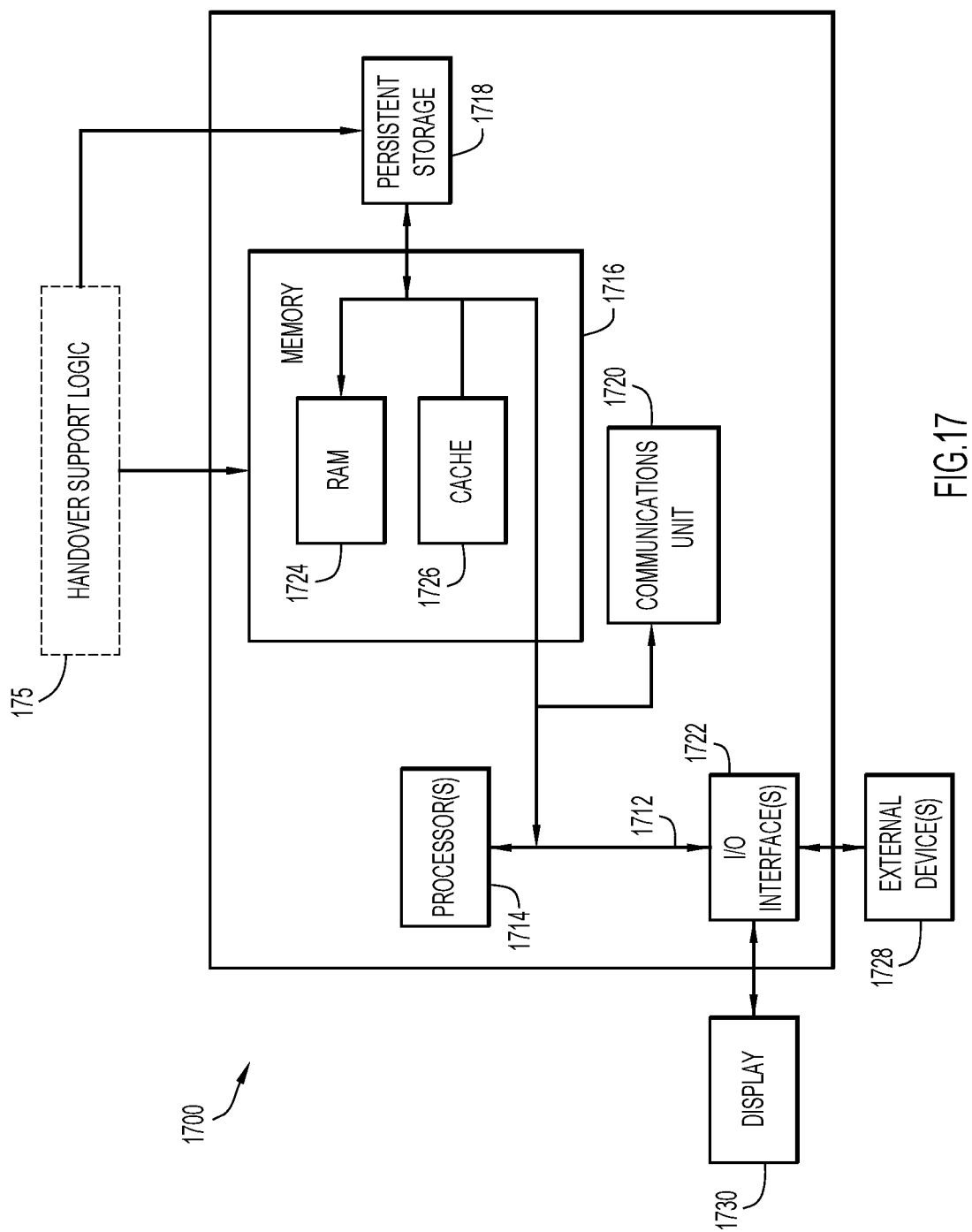
FIG. 17 illustrates a block diagram of a computing device configured for downlink packet replication to support a handover, according to an example embodiment.

FIG. 17 illustrates a hardware block diagram of an example device 1700 (e.g., CTF 135). It should be appreciated that FIG. 17 provides only an illustration of one embodiment and does not imply any limitations with regard to the environments in which different embodiments may be implemented. Many modifications to the depicted environment may be made.

As depicted, the device 1700 includes a bus 1712, which provides communications between computer processor(s) 1714, memory 1716, persistent storage 1718, communications unit 1720, and Input/Output (I/O) interface(s) 1722. Bus 1712 can be implemented with any architecture designed for passing data and/or control information between processors (such as microprocessors, communications and network processors, etc.), system memory, peripheral devices, and any other hardware components within a system. For example, bus 1712 can be implemented with one or more buses.

Memory 1716 and persistent storage 1718 are computer readable storage media. In the depicted embodiment, memory 1716 includes Random Access Memory (RAM) 1724 and cache memory 1726. In general, memory 1716 can include any suitable volatile or non-volatile computer readable storage media. Instructions for handover support logic 175 may be stored in memory 1716 or persistent storage 1718 for execution by computer processor(s) 1714.

One or more programs may be stored in persistent storage 1718 for execution by one or more of the respective computer processors 1714 via one or more memories of memory 1716. The persistent storage 1718 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 1718 may also be removable. For example, a removable hard drive may be used for persistent storage 1718. Other examples include optical and magnetic disks, thumb drives, and smart cards that are inserted into a drive for transfer onto another computer readable storage medium that is also part of persistent storage 1718.

Communications unit 1720, in these examples, provides for communications with other data processing systems or devices. In these examples, communications unit 1720 includes one or more network interface cards. Communications unit 1720 may provide communications through the use of either or both physical and wireless communications links.

I/O interface(s) 1722 allows for input and output of data with other devices that may be connected to device 1700. For example, I/O interface(s) 1722 may provide a connection to external devices 1728 such as a keyboard, keypad, a touch screen, and/or some other suitable input device. External devices 1728 can also include portable computer readable storage media such as database systems, thumb drives, portable optical or magnetic disks, and memory cards.

Software and data used to practice embodiments can be stored on such portable computer readable storage media and can be loaded onto persistent storage 1718 via I/O interface(s) 1722. I/O interface(s) 1722 may also connect to a display 1730. Display 1730 provides a mechanism to display data to a user and may be, for example, a computer monitor.

Figure 18:
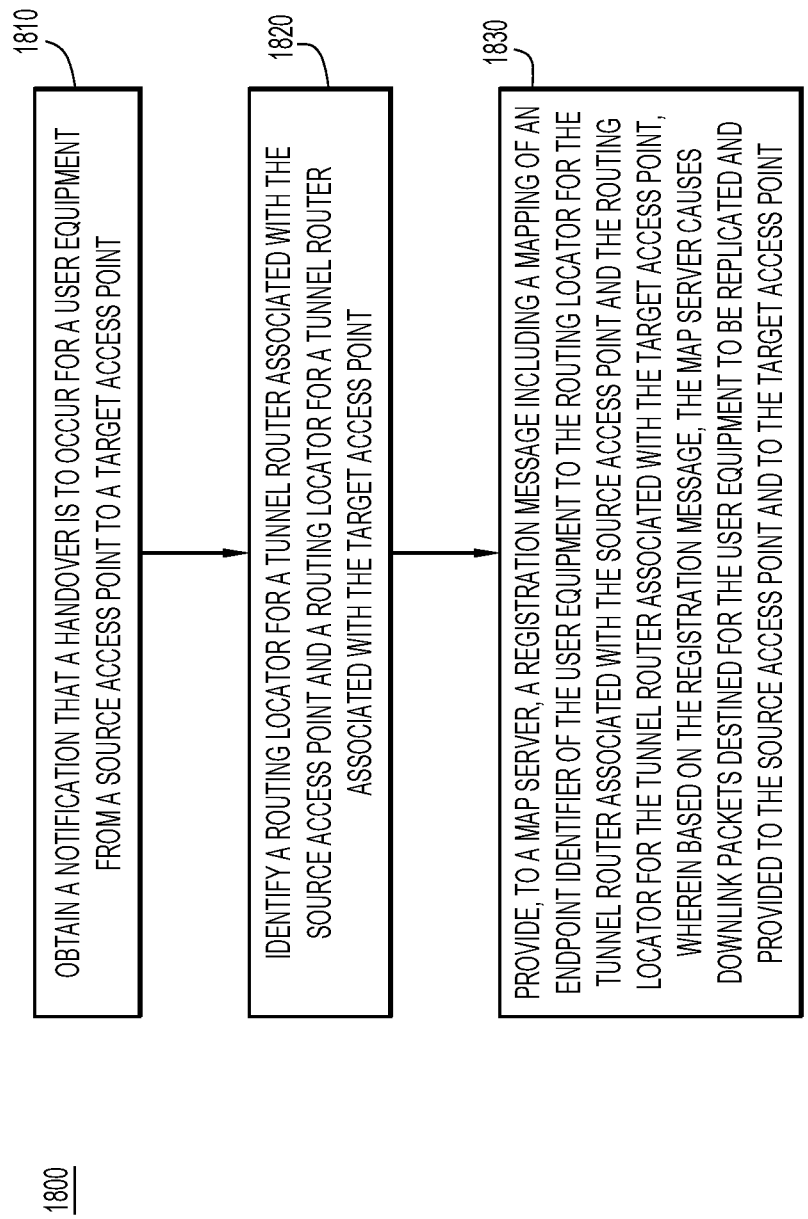
FIG. 18 illustrates a flowchart of a method for downlink packet replication on a fabric node or on a source AP using a target AP as a secondary AP in an S1AP handover scenario, according to an example embodiment.

FIG. 18 illustrates a flowchart of an example method 1800 for downlink packet replication on a fabric node or on a source AP using a target access point as a secondary AP in an S1AP handover scenario. Method 1800 may be performed by CTF 135. At operation 1810, CTF 135 obtains a notification that a handover is to occur for a UE from a source AP to a target AP. At operation 1820, CTF 135 identifies a RLOC for a tunnel router associated with the source AP and a RLOC for a tunnel router associated with the target AP. At operation 1830, CTF 135 provides, to a MS, a registration message including a mapping of an endpoint identifier of the UE to the RLOC for the tunnel router associated with the source AP and the RLOC for the tunnel router associated with the target AP. Based on the registration message, the MS causes downlink packets destined for the UE to be replicated and provided to the source AP and to the target AP.

Figure 19:
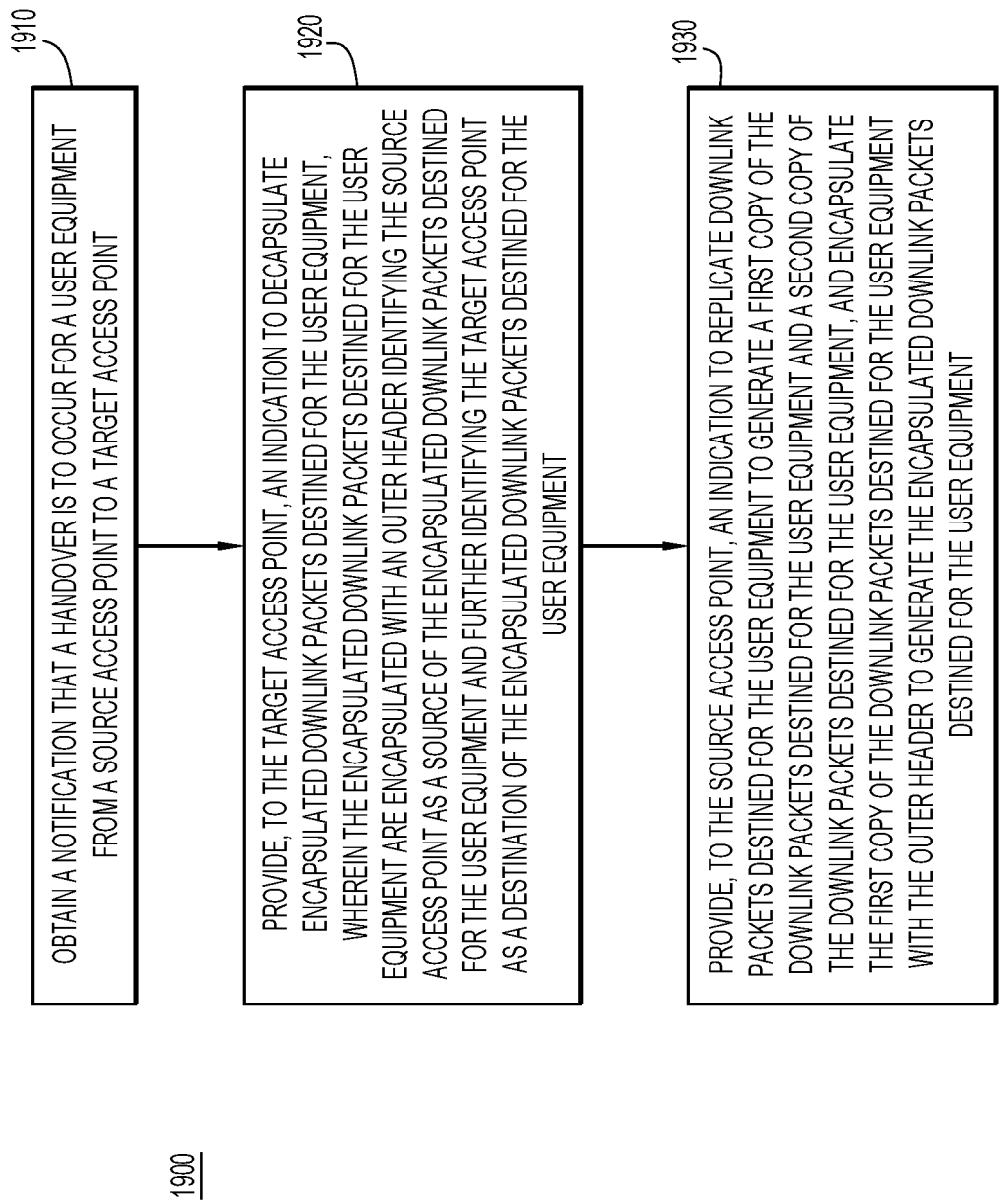
FIG. 19 illustrates a flowchart of a method for downlink packet replication on a source AP using packet encapsulation in an S1AP handover scenario, according to an example embodiment.

FIG. 19 illustrates a flowchart of an example method 1900 for downlink packet replication on a source AP using packet encapsulation in an S1AP handover scenario. Method 1900 may be performed by CTF 135. At operation 1910, CTF 135 obtains a notification that a handover is to occur for a UE from a source AP to a target AP. At operation 1920, CTF 135 provides, to the target AP, an indication to decapsulate encapsulated downlink packets destined for the UE. The encapsulated downlink packets destined for the UE are encapsulated with an outer header identifying the source AP as a source of the encapsulated downlink packets destined for the UE and further identifying the target AP as a destination of the encapsulated downlink packets destined for the UE. At operation 1930, CTF 135 provides, to the source AP, an indication to replicate downlink packets destined for the UE to generate a first copy of the downlink packets destined for the UE and a second copy of the downlink packets destined for the UE, and encapsulate the first copy of the downlink packets destined for the UE with the outer header to generate the encapsulated downlink packets destined for the UE.

The techniques described herein may utilize MS mobility scalability capabilities, and may be applied to any suitable cellular technology (e.g., 4G, 5G, etc.). For example, while certain embodiments described herein relate to 4G technology, it will be appreciated that these techniques may also be applicable to 5G technology. In particular, the descriptions provided herein for the handover procedures in the 4G case may be functionally similar to analogous handover procedures in the 5G case. For example, the 5G case may utilize a gNB instead of an eNB, an N2 handover instead of an S1AP handover, and an Xn handover instead of an X2 handover. Other telecommunication capabilities, such as Wi-Fi®, may also be incorporated. Various embodiments may be envisioned.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless)

that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a notification that a handover is to occur for a user equipment from a source access point to a target access point; identifying a routing locator for a tunnel router associated with the source access point and a routing locator for a tunnel router associated with the target access point; and providing, to a map server, a registration message including a mapping of an endpoint identifier of the user equipment to the routing locator for the tunnel router associated with the source access point and the routing locator for the tunnel router associated with the target access point, wherein based on the registration message, the map server causes downlink packets destined for the user equipment to be replicated and provided to the source access point and to the target access point.

In one example, the tunnel router associated with the source access point and the tunnel router associated with the target access point are a single tunnel router, identifying includes identifying a single routing locator for the single tunnel router, and providing includes providing a registration message including a mapping of the endpoint identifier of the user equipment to the single routing locator.

In a further example, providing includes providing a registration message including an indication for the single tunnel router to replicate the downlink packets destined for the user equipment to generate a first copy of the downlink packets destined for the user equipment and a second copy of the downlink packets destined for the user equipment, provide the first copy of the downlink packets destined for the user equipment to the source access point, and provide the second copy of the downlink packets destined for the user equipment to the target access point; based on the registration message, the map server provides, to the single tunnel router, a notification message including the mapping of the endpoint identifier of the user equipment to the single routing locator and the indication; and based on the notification message, the single tunnel router replicates the downlink packets destined for the user equipment to generate the first copy of the downlink packets destined for the user equipment and the second copy of the downlink packets destined for the user equipment, provides the first copy of the downlink packets destined for the user equipment to the source access point, and provides the second copy of the downlink packets destined for the user equipment to the target access point.

In another further example, providing includes providing a registration message including an indication that the target access point is a secondary access point to which the single tunnel router is to provide any of the downlink packets destined for the user equipment that are obtained from the source access point; based on the registration message, the map server provides, to the single tunnel router, a notification message including the mapping of the endpoint identifier of the user equipment to the single routing locator and the indication that the target access point is the secondary access point; the single tunnel router provides the downlink packets destined for the user equipment to the source access point; the source access point replicates the downlink packets destined for the user equipment to generate a first copy of the downlink packets destined for the user equipment and a second copy of the downlink packets destined for the user equipment, and provides the first copy of the downlink packets destined for the user equipment to the single tunnel router; and based on the notification message, the single tunnel router provides the first copy of the downlink packets destined for the user equipment to the target access point.

In still another further example, the method further comprises: obtaining a notification that the handover has occurred; and providing, to the map server, another registration message including the mapping of the endpoint identifier of the user equipment to the single routing locator, the other registration message including an indication that the single routing locator is associated with the target access point, wherein based on the other registration message, the map server provides, to the single tunnel router, a notification message including the mapping of the endpoint identifier of the user equipment to the single routing locator and an indication to provide the downlink packets destined for the user equipment to the target access point, and based on the notification message, the single tunnel router provides the downlink packets destined for the user equipment to the target access point.

In one example, the tunnel router associated with the source access point is different from the tunnel router associated with the target access point.

In a further example, providing includes providing a registration message including an indication for a border node to replicate the downlink packets destined for the user equipment to generate a first copy of the downlink packets destined for the user equipment and a second copy of the downlink packets destined for the user equipment, provide the first copy of the downlink packets destined for the user equipment to the tunnel router associated with the source access point, and provide the second copy of the downlink packets destined for the user equipment to the tunnel router associated with the target access point; based on the registration message, the map server provides, to the border node, a publication including the mapping of the endpoint identifier of the user equipment to the routing locator for the tunnel router associated with the source access point and the routing locator for the tunnel router associated with the target access point, and the indication for a border node to replicate the downlink packets destined for the user equipment to generate the first copy of the downlink packets destined for the user equipment and the second copy of the downlink packets destined for the user equipment, provide the first copy of the downlink packets destined for the user equipment to the tunnel router associated with the source access point, and provide the second copy of the downlink packets destined for the user equipment to the tunnel router associated with the target access point; and based on the publication, the border node replicates the downlink packets destined for the user equipment to generate the first copy of the downlink packets destined for the user equipment and the second copy of the downlink packets destined for the user equipment, provides the first copy of the downlink packets destined for the user equipment to the tunnel router associated with the source access point, and provides the second copy of the downlink packets destined for the user equipment to the tunnel router associated with the target access point.

In a still further example, the method further comprises: obtaining a notification that the handover has occurred; and providing, to the map server, another registration message including the mapping of the endpoint identifier of the user equipment to the routing locator for the tunnel router associated with the target access point, wherein based on the other registration message, the map server provides, to the border node, a publication including the mapping of the endpoint identifier of the user equipment to the routing locator for the tunnel router associated with the target access point, and an indication to provide the downlink packets destined for the user equipment to the tunnel router associated with the target access point, and based on the publication, the border node provides the downlink packets destined for the user equipment to the tunnel router associated with the target access point.

In another further example, providing includes providing a registration message including an indication that the target access point is a secondary access point to which the tunnel router associated with the source access point is to provide any of the downlink packets destined for the user equipment that are obtained from the source access point; based on the registration message, the map server provides, to the tunnel router associated with the source access point, a notification message including the mapping of the endpoint identifier of the user equipment to the routing locator for the tunnel router associated with the source access point and the routing locator for the tunnel router associated with the target access point, and the indication that the target access point is the secondary access point; the tunnel router associated with the source access point provides the downlink packets destined for the user equipment to the source access point; the source access point replicates the downlink packets destined for the user equipment to generate a first copy of the downlink packets destined for the user equipment and a second copy of the downlink packets destined for the user equipment and provides the first copy of the downlink packets destined for the user equipment to the tunnel router associated with the source access point; based on the notification message, the tunnel router associated with the source access point provides the first copy of the downlink packets destined for the user equipment to the tunnel router associated with the target access point; and the tunnel router associated with the target access point provides the first copy of the downlink packets destined for the user equipment to the target access point.

In another still further example, the method further comprises: obtaining a notification that the handover has occurred; and providing, to the map server, another registration message including the mapping of the endpoint identifier of the user equipment to the routing locator for the tunnel router associated with the target access point, wherein based on the other registration message, the map server provides, to the tunnel router associated with the target access point, a notification message including the mapping of the endpoint identifier of the user equipment to the routing locator for the tunnel router associated with the target access point, and an indication to provide the downlink packets destined for the user equipment to the target access point, and based on the notification message, the tunnel router associated with the target access point provides the downlink packets destined for the user equipment to the target access point.

In one example, the source access point is a first fourth generation evolved Node B and the target access point is a second fourth generation evolved Node B; the source access point is a first fifth generation next generation Node B and the target access point is a second fifth generation next generation Node B; or the source access point is a first citizens broadband radio service device and the target access point is a second citizens broadband radio service device.

In another form, an apparatus is provided. The apparatus comprises: a network interface configured to obtain or provide network communications; and one or more processors coupled to the network interface, wherein the one or more processors are configured to: obtain a notification that a handover is to occur for a user equipment from a source access point to a target access point; identify a routing locator for a tunnel router associated with the source access point and a routing locator for a tunnel router associated with the target access point; and provide, to a map server, a registration message including a mapping of an endpoint identifier of the user equipment to the routing locator for the tunnel router associated with the source access point and the routing locator for the tunnel router associated with the target access point, wherein based on the registration message, the map server causes downlink packets destined for the user equipment to be replicated and provided to the source access point and to the target access point.

In another form, one or more non-transitory computer readable storage media are provided. The non-transitory computer readable storage media are encoded with instructions that, when executed by a processor, cause the processor to: obtain a notification that a handover is to occur for a user equipment from a source access point to a target access point; identify a routing locator for a tunnel router associated with the source access point and a routing locator for a tunnel router associated with the target access point; and provide, to a map server, a registration message including a mapping of an endpoint identifier of the user equipment to the routing locator for the tunnel router associated with the source access point and the routing locator for the tunnel router associated with the target access point, wherein based on the registration message, the map server causes downlink packets destined for the user equipment to be replicated and provided to the source access point and to the target access point.

In one form, another method is provided. The other method comprises: obtaining a notification that a handover is to occur for a user equipment from a source access point to a target access point; providing, to the target access point, an indication to decapsulate encapsulated downlink packets destined for the user equipment, wherein the encapsulated downlink packets destined for the user equipment are encapsulated with an outer header identifying the source access point as a source of the encapsulated downlink packets destined for the user equipment and further identifying the target access point as a destination of the encapsulated downlink packets destined for the user equipment; and providing, to the source access point, an indication to replicate downlink packets destined for the user equipment to generate a first copy of the downlink packets destined for the user equipment and a second copy of the downlink packets destined for the user equipment, and encapsulate the first copy of the downlink packets destined for the user equipment with the outer header to generate the encapsulated downlink packets destined for the user equipment.

In one example, the source access point and the target access point are associated with a single tunnel router.

In a further example, the source access point replicates the downlink packets destined for the user equipment to generate the first copy of the downlink packets destined for the user equipment and the second copy of the downlink packets destined for the user equipment, encapsulates the first copy of the downlink packets destined for the user equipment with the outer header to generate the encapsulated downlink packets destined for the user equipment, and provides the encapsulated downlink packets destined for the user equipment to the single tunnel router; the single tunnel router identifies the target access point as the destination of the encapsulated downlink packets destined for the user equipment based on the outer header and provides the encapsulated downlink packets destined for the user equipment to the target access point; and the target access point decapsulates the encapsulated downlink packets destined for the user equipment.

In another further example, the other method further comprises: obtaining a notification that the handover has occurred; and providing, to a map server, a registration message including a mapping of an endpoint identifier of the user equipment to a single routing locator for the single tunnel router, the registration message including an indication that the single routing locator is associated with the target access point, wherein based on the registration message, the map server provides, to the single tunnel router, a notification message including the mapping of the user equipment to the single routing locator and an indication to provide the downlink packets destined for the user equipment to the target access point, and based on the notification message, the single tunnel router provide the downlink packets destined for the user equipment to the target access point.

In one example, a tunnel router associated with the source access point is different from a tunnel router associated with the target access point.

In a further example, the source access point replicates the downlink packets destined for the user equipment to generate the first copy of the downlink packets destined for the user equipment and the second copy of the downlink packets destined for the user equipment, encapsulates the first copy of the downlink packets destined for the user equipment with the outer header to generate the encapsulated downlink packets destined for the user equipment, and provides the encapsulated downlink packets destined for the user equipment to the tunnel router associated with the source access point; the tunnel router associated with the source access point identifies the target access point as the destination of the encapsulated downlink packets destined for the user equipment based on the outer header and provides the encapsulated downlink packets destined for the user equipment to the tunnel router associated with the target access point; the tunnel router associated with the target access point identifies the target access point as the destination of the encapsulated downlink packets destined for the user equipment based on the outer header and provides the encapsulated downlink packets destined for the user equipment to the target access point; and the target access point decapsulates the encapsulated downlink packets destined for the user equipment.

In still another further example, the other method comprises: obtaining a notification that the handover has occurred; and providing, to a map server, a registration message including a mapping of an endpoint identifier of the user equipment to the tunnel router associated with the target access point, wherein based on the registration message, the map server provides, to the tunnel router associated with the target access point, a notification message including the mapping of the user equipment to the tunnel router associated with the target access point and an indication to provide the downlink packets destined for the user equipment to the target access point; and based on the notification message, the tunnel router associated with the target access point provides the downlink packets destined for the user equipment to the target access point.

In one example, the method further comprises: obtaining a notification that the target access point has stopped or will stop decapsulating the encapsulated downlink packets destined for the user equipment; and providing, to the source access point, an indication to stop replicating the downlink packets destined for the user equipment and encapsulating the downlink packets destined for the user equipment with the outer header to generate the encapsulated downlink packets destined for the user equipment.

In one example, the source access point is a first fourth generation evolved Node B and the target access point is a second fourth generation evolved Node B; the source access point is a first fifth generation next generation Node B and the target access point is a second fifth generation next generation Node B; or the source access point is a first citizens broadband radio service device and the target access point is a second citizens broadband radio service device.

In another form, another apparatus is provided. The other apparatus comprises: a network interface configured to obtain or provide network communications; and one or more processors coupled to the network interface, wherein the one or more processors are configured to: obtain a notification that a handover is to occur for a user equipment from a source access point to a target access point; provide, to the target access point, an indication to decapsulate encapsulated downlink packets destined for the user equipment, wherein the encapsulated downlink packets destined for the user equipment are encapsulated with an outer header identifying the source access point as a source of the encapsulated downlink packets destined for the user equipment and further identifying the target access point as a destination of the encapsulated downlink packets destined for the user equipment; and provide, to the source access point, an indication to replicate downlink packets destined for the user equipment to generate a first copy of the downlink packets destined for the user equipment and a second copy of the downlink packets destined for the user equipment, and encapsulate the first copy of the downlink packets destined for the user equipment with the outer header to generate the encapsulated downlink packets destined for the user equipment.

In another form, another one or more non-transitory computer readable storage media are provided. The other one or more non-transitory computer readable storage media are encoded with instructions that, when executed by a processor, cause the processor to: obtain a notification that a handover is to occur for a user equipment from a source access point to a target access point; provide, to the target access point, an indication to decapsulate encapsulated downlink packets destined for the user equipment, wherein the encapsulated downlink packets destined for the user equipment are encapsulated with an outer header identifying the source access point as a source of the encapsulated downlink packets destined for the user equipment and further identifying the target access point as a destination of the encapsulated downlink packets destined for the user equipment; and provide, to the source access point, an indication to replicate downlink packets destined for the user equipment to generate a first copy of the downlink packets destined for the user equipment and a second copy of the downlink packets destined for the user equipment, and encapsulate the first copy of the downlink packets destined for the user equipment with the outer header to generate the encapsulated downlink packets destined for the user equipment.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining a notification that a handover is to occur for a user equipment from a source access point to a target access point;
   identifying a routing locator for a tunnel router associated with the source access point and a routing locator for a tunnel router associated with the target access point; and
   providing, to a map server, a registration message including a mapping of an endpoint identifier of the user equipment to the routing locator for the tunnel router associated with the source access point and the routing locator for the tunnel router associated with the target access point, wherein
   based on the registration message, the map server causes downlink packets destined for the user equipment to be replicated and provided to the source access point and to the target access point.

2. The method of claim 1, wherein the tunnel router associated with the source access point and the tunnel router associated with the target access point are a single tunnel router, and wherein:
   identifying includes identifying a single routing locator for the single tunnel router; and
   providing includes providing a registration message including a mapping of the endpoint identifier of the user equipment to the single routing locator.

3. The method of claim 2, wherein:
   providing includes providing a registration message including an indication for the single tunnel router to replicate the downlink packets destined for the user equipment to generate a first copy of the downlink packets destined for the user equipment and a second copy of the downlink packets destined for the user equipment, provide the first copy of the downlink packets destined for the user equipment to the source access point, and provide the second copy of the downlink packets destined for the user equipment to the target access point;
   based on the registration message, the map server provides, to the single tunnel router, a notification message including the mapping of the endpoint identifier of the user equipment to the single routing locator and the indication; and
   based on the notification message, the single tunnel router replicates the downlink packets destined for the user equipment to generate the first copy of the downlink packets destined for the user equipment and the second copy of the downlink packets destined for the user equipment, provides the first copy of the downlink packets destined for the user equipment to the source access point, and provides the second copy of the downlink packets destined for the user equipment to the target access point.

4. The method of claim 2, wherein:
   providing includes providing a registration message including an indication that the target access point is a secondary access point to which the single tunnel router is to provide any of the downlink packets destined for the user equipment that are obtained from the source access point;
   based on the registration message, the map server provides, to the single tunnel router, a notification message including the mapping of the endpoint identifier of the user equipment to the single routing locator and the indication that the target access point is the secondary access point;
   the single tunnel router provides the downlink packets destined for the user equipment to the source access point;
   the source access point replicates the downlink packets destined for the user equipment to generate a first copy of the downlink packets destined for the user equipment and a second copy of the downlink packets destined for the user equipment, and provides the first copy of the downlink packets destined for the user equipment to the single tunnel router; and
   based on the notification message, the single tunnel router provides the first copy of the downlink packets destined for the user equipment to the target access point.

5. The method of claim 2, further comprising:
   obtaining a notification that the handover has occurred; and
   providing, to the map server, another registration message including the mapping of the endpoint identifier of the user equipment to the single routing locator, the other registration message including an indication that the single routing locator is associated with the target access point, wherein
   based on the other registration message, the map server provides, to the single tunnel router, a notification message including the mapping of the endpoint identifier of the user equipment to the single routing locator and an indication to provide the downlink packets destined for the user equipment to the target access point, and
   based on the notification message, the single tunnel router provides the downlink packets destined for the user equipment to the target access point.

6. The method of claim 1, wherein the tunnel router associated with the source access point is different from the tunnel router associated with the target access point.

7. The method of claim 6, wherein:
   providing includes providing a registration message including an indication for a border node to replicate the downlink packets destined for the user equipment to generate a first copy of the downlink packets destined for the user equipment and a second copy of the downlink packets destined for the user equipment, provide the first copy of the downlink packets destined for the user equipment to the tunnel router associated with the source access point, and provide the second copy of the downlink packets destined for the user equipment to the tunnel router associated with the target access point;
   based on the registration message, the map server provides, to the border node, a publication including the mapping of the endpoint identifier of the user equipment to the routing locator for the tunnel router associated with the source access point and the routing locator for the tunnel router associated with the target access point, and the indication for the border node to replicate the downlink packets destined for the user equipment to generate the first copy of the downlink packets destined for the user equipment and the second copy of the downlink packets destined for the user equipment, provide the first copy of the downlink packets destined for the user equipment to the tunnel router associated with the source access point, and provide the second copy of the downlink packets destined for the user equipment to the tunnel router associated with the target access point; and based on the publication, the border node replicates the downlink packets destined for the user equipment to generate the first copy of the downlink packets destined for the user equipment and the second copy of the downlink packets destined for the user equipment, provides the first copy of the downlink packets destined for the user equipment to the tunnel router associated with the source access point, and provides the second copy of the downlink packets destined for the user equipment to the tunnel router associated with the target access point.

8. The method of claim 7, further comprising:

obtaining a notification that the handover has occurred; and providing, to the map server, another registration message including the mapping of the endpoint identifier of the user equipment to the routing locator for the tunnel router associated with the target access point, wherein based on the other registration message, the map server provides, to the border node, a publication including the mapping of the endpoint identifier of the user equipment to the routing locator for the tunnel router associated with the target access point, and an indication to provide the downlink packets destined for the user equipment to the tunnel router associated with the target access point, and based on the publication, the border node provides the downlink packets destined for the user equipment to the tunnel router associated with the target access point.

9. The method of claim 6, wherein:

providing includes providing a registration message including an indication that the target access point is a secondary access point to which the tunnel router associated with the source access point is to provide any of the downlink packets destined for the user equipment that are obtained from the source access point;

based on the registration message, the map server provides, to the tunnel router associated with the source access point, a notification message including the mapping of the endpoint identifier of the user equipment to the routing locator for the tunnel router associated with the source access point and the routing locator for the tunnel router associated with the target access point, and the indication that the target access point is the secondary access point;

the tunnel router associated with the source access point provides the downlink packets destined for the user equipment to the source access point;

the source access point replicates the downlink packets destined for the user equipment to generate a first copy of the downlink packets destined for the user equipment and a second copy of the downlink packets destined for the user equipment and provides the first copy of the downlink packets destined for the user equipment to the tunnel router associated with the source access point;

based on the notification message, the tunnel router associated with the source access point provides the first copy of the downlink packets destined for the user equipment to the tunnel router associated with the target access point; and the tunnel router associated with the target access point provides the first copy of the downlink packets destined for the user equipment to the target access point.

10. The method of claim 9, further comprising:

obtaining a notification that the handover has occurred; and providing, to the map server, another registration message including the mapping of the endpoint identifier of the user equipment to the routing locator for the tunnel router associated with the target access point, wherein based on the other registration message, the map server provides, to the tunnel router associated with the target access point, a notification message including the mapping of the endpoint identifier of the user equipment to the routing locator for the tunnel router associated with the target access point, and an indication to provide the downlink packets destined for the user equipment to the target access point, and based on the notification message, the tunnel router associated with the target access point provides the downlink packets destined for the user equipment to the target access point.

11. The method of claim 1, wherein:

the source access point is a first fourth generation evolved Node B and the target access point is a second fourth generation evolved Node B;

the source access point is a first fifth generation next generation Node B and the target access point is a second fifth generation next generation Node B; or the source access point is a first citizens broadband radio service device and the target access point is a second citizens broadband radio service device.

12. A method comprising:

obtaining a notification that a handover is to occur for a user equipment from a source access point to a target access point;

providing, to the target access point, an indication to decapsulate encapsulated downlink packets destined for the user equipment, wherein the encapsulated downlink packets destined for the user equipment are encapsulated with an outer header identifying the source access point as a source of the encapsulated downlink packets destined for the user equipment and further identifying the target access point as a destination of the encapsulated downlink packets destined for the user equipment; and providing, to the source access point, an indication to replicate downlink packets destined for the user equipment to generate a first copy of the downlink packets destined for the user equipment and a second copy of the downlink packets destined for the user equipment, and encapsulate the first copy of the downlink packets destined for the user equipment with the outer header to generate the encapsulated downlink packets destined for the user equipment.

13. The method of claim 12, wherein the source access point and the target access point are associated with a single tunnel router.

14. The method of claim 13, wherein:
the source access point replicates the downlink packets destined for the user equipment to generate the first copy of the downlink packets destined for the user equipment and the second copy of the downlink packets destined for the user equipment, encapsulates the first copy of the downlink packets destined for the user equipment with the outer header to generate the encapsulated downlink packets destined for the user equipment, and provides the encapsulated downlink packets destined for the user equipment to the single tunnel router;
the single tunnel router identifies the target access point as the destination of the encapsulated downlink packets destined for the user equipment based on the outer header and provides the encapsulated downlink packets destined for the user equipment to the target access point; and
the target access point decapsulates the encapsulated downlink packets destined for the user equipment.

15. The method of claim 13, further comprising:
obtaining a notification that the handover has occurred; and
providing, to a map server, a registration message including a mapping of an endpoint identifier of the user equipment to a single routing locator for the single tunnel router, the registration message including an indication that the single routing locator is associated with the target access point, wherein
based on the registration message, the map server provides, to the single tunnel router, a notification message including the mapping of the user equipment to the single routing locator and an indication to provide the downlink packets destined for the user equipment to the target access point, and
based on the notification message, the single tunnel router provide the downlink packets destined for the user equipment to the target access point.

16. The method of claim 12, wherein a tunnel router associated with the source access point is different from a tunnel router associated with the target access point.

17. The method of claim 16, wherein:
the source access point replicates the downlink packets destined for the user equipment to generate the first copy of the downlink packets destined for the user equipment and the second copy of the downlink packets destined for the user equipment, encapsulates the first copy of the downlink packets destined for the user equipment with the outer header to generate the encapsulated downlink packets destined for the user equipment, and provides the encapsulated downlink packets destined for the user equipment to the tunnel router associated with the source access point;
the tunnel router associated with the source access point identifies the target access point as the destination of the encapsulated downlink packets destined for the user equipment based on the outer header and provides the encapsulated downlink packets destined for the user equipment to the tunnel router associated with the target access point;
the tunnel router associated with the target access point identifies the target access point as the destination of the encapsulated downlink packets destined for the user equipment based on the outer header and provides the encapsulated downlink packets destined for the user equipment to the target access point; and the target access point decapsulates the encapsulated downlink packets destined for the user equipment.

18. The method of claim 16, further comprising:
obtaining a notification that the handover has occurred; and
providing, to a map server, a registration message including a mapping of an endpoint identifier of the user equipment to the tunnel router associated with the target access point, wherein
based on the registration message, the map server provides, to the tunnel router associated with the target access point, a notification message including the mapping of the user equipment to the tunnel router associated with the target access point and an indication to provide the downlink packets destined for the user equipment to the target access point; and
based on the notification message, the tunnel router associated with the target access point provides the downlink packets destined for the user equipment to the target access point.

19. The method of claim 12, further comprising:
obtaining a notification that the target access point has stopped or will stop decapsulating the encapsulated downlink packets destined for the user equipment; and
providing, to the source access point, an indication to stop replicating the downlink packets destined for the user equipment and encapsulating the downlink packets destined for the user equipment with the outer header to generate the encapsulated downlink packets destined for the user equipment.

20. The method of claim 12, wherein:
the source access point is a first fourth generation evolved Node B and the target access point is a second fourth generation evolved Node B;
the source access point is a first fifth generation next generation Node B and the target access point is a second fifth generation next generation Node B; or
the source access point is a first citizens broadband radio service device and the target access point is a second citizens broadband radio service device.

21. An apparatus comprising:
a network interface configured to obtain or provide network communications; and
one or more processors coupled to the network interface, wherein the one or more processors are configured to:
obtain a notification that a handover is to occur for a user equipment from a source access point to a target access point;
identify a routing locator for a tunnel router associated with the source access point and a routing locator for a tunnel router associated with the target access point; and
provide, to a map server, a registration message including a mapping of an endpoint identifier of the user equipment to the routing locator for the tunnel router associated with the source access point and the routing locator for the tunnel router associated with the target access point, wherein
based on the registration message, the map server causes downlink packets destined for the user equipment to be replicated and provided to the source access point and to the target access point.

22. The apparatus of claim 21, wherein the tunnel router associated with the source access point and the tunnel router associated with the target access point are a single tunnel router, and wherein the one or more processors are configured to:

identify a single routing locator for the single tunnel router; and provide a registration message including a mapping of the endpoint identifier of the user equipment to the single routing locator.

* * * * *